United States Patent [19]

Stirling et al.

[11] Patent Number: 5,317,635
[45] Date of Patent: May 31, 1994

[54] INTERDICTION METHOD AND APPARATUS WITH MODE CONTROL FOR VARIABLE FREQUENCY ELEMENTS

[75] Inventors: Ronald C. Stirling, Lilburn; Mark E. Schutte, Sugar Hill; Neil C. Robertson, Norcross, all of Ga.

[73] Assignee: Scientific-Atlanta, Inc., Norcross, Ga.

[21] Appl. No.: 896,261
[22] Filed: Jun. 10, 1992
[51] Int. Cl.$^5$ ............................................. H04N 7/167
[52] U.S. Cl. ....................................... 380/7; 380/20
[58] Field of Search .................... 380/6, 7, 10, 20; 455/1, 26.1; 358/349

[56] References Cited

U.S. PATENT DOCUMENTS

| | | | |
|---|---|---|---|
| 3,760,097 | 9/1973 | Burroughs et al. | 178/5.1 |
| 3,896,262 | 7/1975 | Hudspeth et al. | 178/5.1 |
| 3,899,633 | 8/1975 | Sorenson et al. | 178/5.1 |
| 3,989,887 | 11/1976 | Murphy | 178/5.1 |
| 4,039,954 | 8/1977 | den Toonder | 325/308 |
| 4,091,413 | 5/1978 | Herman | 358/118 |
| 4,148,064 | 4/1979 | Reed | 358/118 |
| 4,334,322 | 6/1982 | Clark, III | 355/62 |
| 4,342,119 | 7/1982 | Seidl | 455/1 |
| 4,343,042 | 8/1982 | Schrock et al. | 455/5 |
| 4,367,557 | 1/1983 | Stern et al. | 455/4 |
| 4,434,436 | 2/1984 | Kleykamp et al. | 358/118 |
| 4,450,481 | 5/1984 | Dickinson | 358/114 |
| 4,498,193 | 2/1985 | Richardson | 455/1 |
| 4,521,809 | 6/1985 | Bingham et al. | 358/120 |
| 4,651,204 | 3/1987 | Uemura | 380/7 |
| 4,737,990 | 4/1988 | Kaneko | 380/7 |
| 4,769,838 | 9/1988 | Hasegawa | 380/7 |
| 4,792,971 | 12/1988 | Uemura | 380/7 |
| 4,825,468 | 4/1989 | Ellis | 380/7 |
| 4,837,820 | 6/1989 | Bellavia, Jr. | 380/7 |
| 4,841,569 | 6/1989 | Wachob | 380/7 |
| 4,903,297 | 2/1990 | Rist et al. | 380/7 |
| 4,912,760 | 3/1990 | West, Jr. et al. | 380/7 |
| 4,914,695 | 8/1990 | Martin | 380/7 |
| 4,963,966 | 10/1990 | Harney et al. | 358/349 |
| 5,014,309 | 5/1991 | West, Jr. | 380/7 |
| 5,068,893 | 11/1991 | West et al. | 380/7 |
| 5,109,286 | 4/1992 | West, Jr. et al. | 358/349 |
| 5,140,633 | 8/1992 | Gurusami et al. | 380/7 |
| 5,142,574 | 8/1992 | West, Jr. et al. | 380/7 |
| 5,233,652 | 8/1993 | Huang et al. | |

FOREIGN PATENT DOCUMENTS

| | | |
|---|---|---|
| 178758 | 4/1986 | European Pat. Off. |
| 360778 | 3/1990 | European Pat. Off. |
| 58-221557 | 12/1983 | Japan |
| 59-61384 | 4/1984 | Japan |

OTHER PUBLICATIONS

"Addressable Tap IT-1-SM" by Control Com, Inc.
"Tier Guard System" by E-Com Corporation.

Primary Examiner—Tod R. Swann
Attorney, Agent, or Firm—Banner, Birch, McKie & Beckett

[57] ABSTRACT

An off-premises method and apparatus for the interdiction of unauthorized channels of a broadband cable television signal includes common circuitry for adjusting the amplitude and equalization levels of the broadband CATV signals and one or more subscriber modules for generating jamming signals of different frequencies which are used to interdict one or more unauthorized channels. Each subscriber module is associated with a subscriber and is programmable and addressable to adjust the jamming parameters of that subscriber independently of other subscribers. Each subscriber module circuit comprises a plurality of latches, each of which is associated with one of a plurality of digital to analog converters. Each of the digital to analog converters drives one or more frequency agile oscillators with its analog output to generate the jamming signals. The subscriber module is based on a sequential state machine which loads frequency control words corresponding to the jammed channels from a frequency control memory into each latch on a cyclic basis. The state machine is adapted to vary the sequence in which frequency control words are read out of the memory to modify the jamming pattern of the subscriber. Corresponding to each frequency control word in the memory is stored one or more mode control bits which are read out contemporaneously with the frequency control words. The mode control bits are used to allow a single digital to analog converter to control one or more voltage control oscillators with different frequency ranges, or to allow control of a single voltage control oscillator with multiple frequency ranges.

14 Claims, 21 Drawing Sheets

| Half/Quarter Duration | BITS |
|---|---|
| 1/4 second | 0 0 |
| 1/2 second | 0 1 |
| 3/4 second | 1 0 |
| 1 second | 1 1 |

STATUS REG. ST1

| BIT | FUNCTION | STATUS |
|---|---|---|
| 0 | X | X |
| 1 | X | X |
| 2 | X | X |
| 3 | DISCON MODE | 0 - STATIC / 1 - DYNAMIC |
| 4 | DISCON STATE | 0 - LOW / 1 - HIGH |
| 5 | Half/Quarter Duration | bit 0 |
| 6 | Half/Quarter Duration | bit 1 |
| 7 | X | X |

STATUS REG. ST2

| BIT | FUNCTION | STATUS |
|---|---|---|
| 0 | PWR 1 | 1 - ON / 0 - OFF |
| 1 | PWR 2 | 1 - ON / 0 - OFF |
| 2 | PWR 3 | 1 - ON / 0 - OFF |
| 3 | PWR 4 | 1 - ON / 0 - OFF |
| 4 | X | X |
| 5 | HOPPING RANGE | 0 - FAST / 1 - SLOW |
| 6 | X | X |
| 7 | X | X |

FIG. 8B

SWITCH REG. SW

| BIT | FUNCTION | STATUS |
|---|---|---|
| 0 | SWITCH 1 | 1 - ASIC / 0 - MICRO |
| 1 | SWITCH 2 | 1 - ASIC / 0 - MICRO |
| 2 | SWITCH 3 | 1 - ASIC / 0 - MICRO |
| 3 | SWITCH 4 | 1 - ASIC / 0 - MICRO |
| 4 | DAC 1 | 0 - NO KEYED / 1 - KEYED |
| 5 | DAC 2 | 0 - NO KEYED / 1 - KEYED |
| 6 | DAC 3 | 0 - NO KEYED / 1 - KEYED |
| 7 | DAC 4 | 0 - NO KEYED / 1 - KEYED |

| CYCLE t (μsec.) | | BITS |
|---|---|---|
| SLOW | FAST | |
| 128 | 64 | 000 |
| 144 | 72 | 001 |
| 160 | 80 | 010 |
| 176 | 88 | 011 |
| 192 | 96 | 100 |
| 208 | 104 | 101 |
| 224 | 112 | 110 |
| 240 | 120 | 111 |

SEQUENCE REG. SEQ

| BIT | FUNCTION | STATUS |
|---|---|---|
| 0 | RANDOM | 1 - ON / 0 - OFF |
| 1 | CONTINUOUS | 0 - ON / 1 - OFF |
| 2 | PULSED | 0 - HALF / 1 - QUARTER |
| 3 | CYCLE t | BIT 0 |
| 4 | CYCLE t | BIT 1 |
| 5 | CYCLE t | BIT 2 |

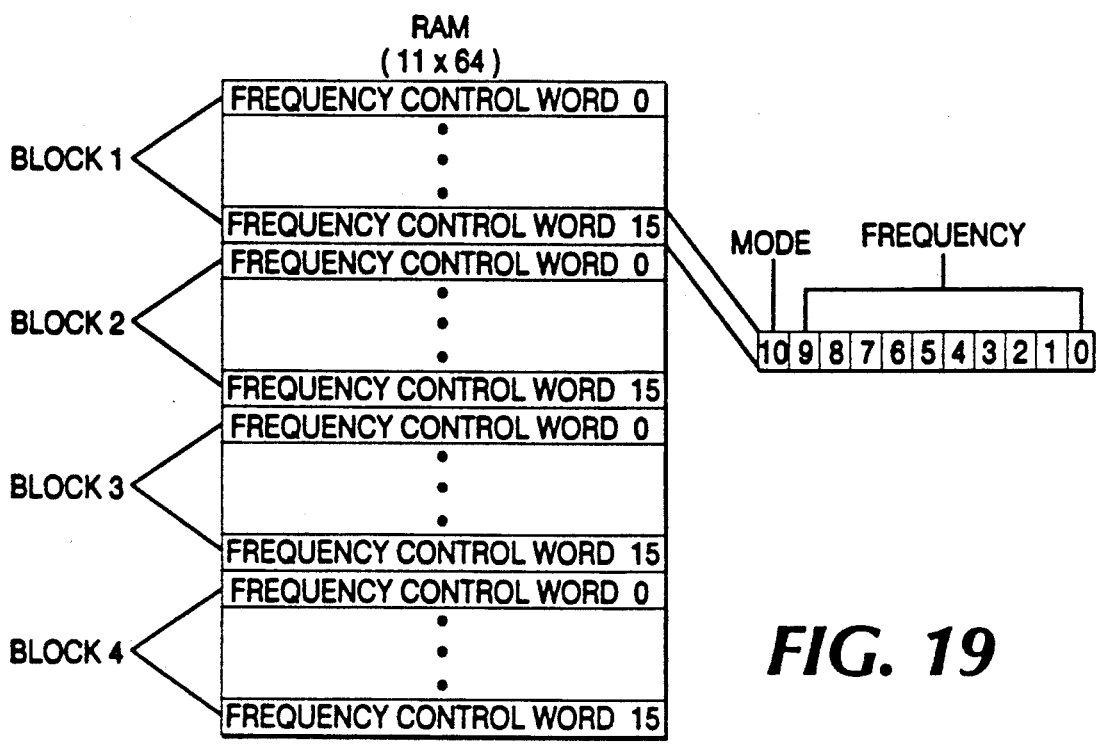
FIG. 19
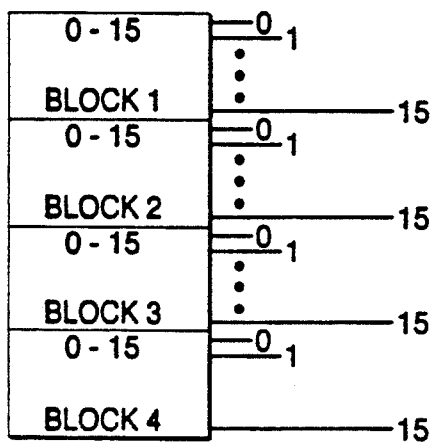
FIG. 20
| ADR | SEED | AD0-AD3 |
|------|------|---------|
| 0000 | 0110 | 0110 |
| 0001 | 0110 | 0111 |
| 0010 | 0110 | 0100 |
| 0011 | 0110 | 0101 |
| 0100 | 0110 | 0010 |
| 0101 | 0110 | 0011 |
| 0110 | 0110 | 0000 |
| 0111 | 0110 | 0001 |
| 1000 | 0110 | 1110 |
| 1001 | 0110 | 1111 |
| 1010 | 0110 | 1100 |
| 1011 | 0110 | 1101 |
| 1100 | 0110 | 1010 |
| 1101 | 0110 | 1011 |
| 1110 | 0110 | 1000 |
| 1111 | 0110 | 1001 |
FIG. 21

| NO. TIME SLOTS | CONTINUOUS, HALF, QUARTER | HALF/QUARTER DURATION | JAMMER DWELL TIME |
|---|---|---|---|
| 4 | CONTINUOUS | N/A | 64 μsec. |
| 3 | CONTINUOUS | N/A | 64 μsec. |
| 2 | CONTINUOUS | N/A | 64 μsec. |
| 1 | CONTINUOUS | N/A | 240 μsec. |
| 1 | HALF | 1/4 sec. | 64 μsec. |
| 1 | HALF | 1/4 sec. | 240 μsec. |
| 1 | QUARTER | 1/4 sec. | 64 μsec. |
| 1 | CONTINUOUS | N/A | 64 μsec. |

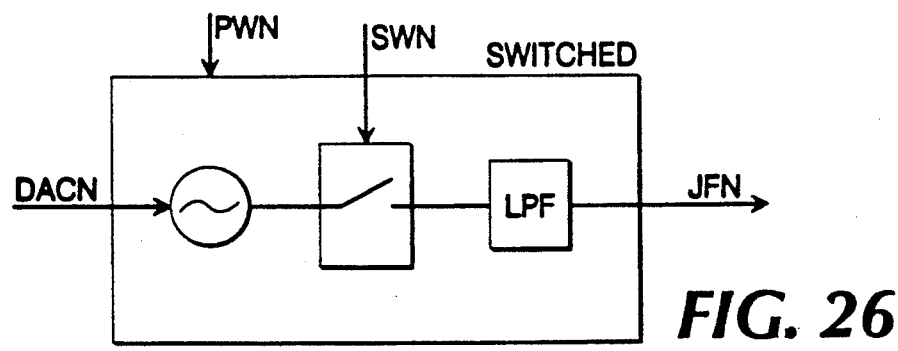
FIG. 26
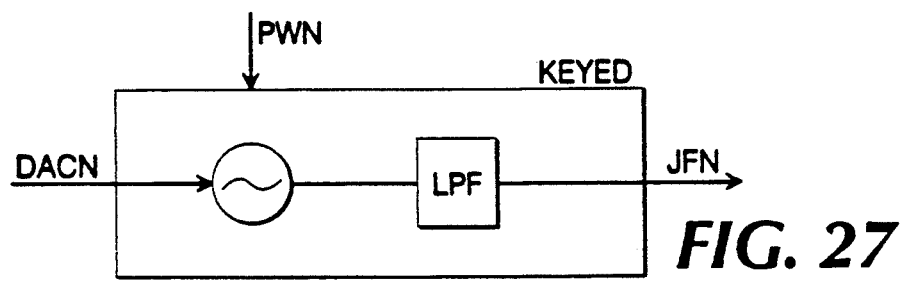
FIG. 27
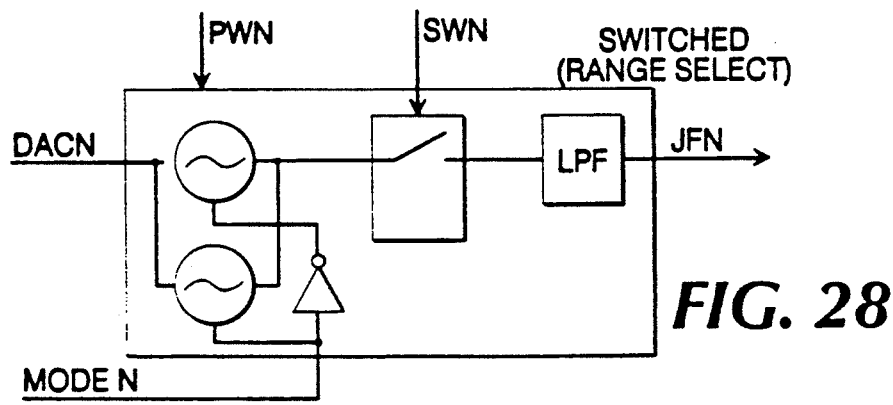
FIG. 28
FIG. 29
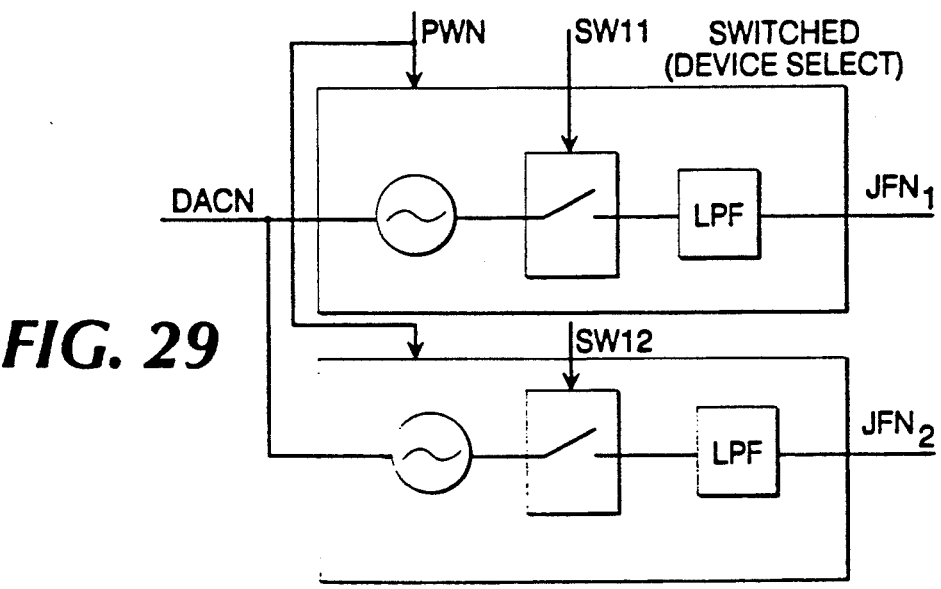

INTERDICTION METHOD AND APPARATUS WITH MODE CONTROL FOR VARIABLE FREQUENCY ELEMENTS

BACKGROUND OF THE INVENTION

1. Technical Field

The invention relates to cable television (CATV) interdiction systems and, more particularly, to a method and apparatus for controlling the jamming parameters in such systems.

2. Description of the Prior Art

In the past, a scrambler has been provided to encode premium television channels at a headend of a cable television system. The applied scrambling precluded reception by an unauthorized converter/decoder at a connected premises. Data representing the channels or tiers of programming to which the subscriber was entitled were addressably transmitted to a particular converter/decoder and stored in an authorization memory. As a result of the addressed transmission, a subsequently transmitted program would be authorized by selectively enabling the decoder portion of the converter/decoder to decode the scrambled premium channel or program.

The provision of one scrambler per premium channel at the headend and the inclusion of a descrambler in each converter/decoder at the premises of the television receiver was particularly expensive. Furthermore, providing a converter/decoder on premises has turned out to be a great temptation to service pirates who imaginatively seek ways to receive premium channels. As a result, cable television equipment manufacturers have entered into a veritable war with such pirates resulting in complicated service authorization protocols, which in some instances involve multiple layers of encryption by both in-band and out-of-band data transmissions thereby further increasing the costs of the converter/decoder. In addition, scrambling systems may leave artifacts in the final signal.

Consequently, the cable industry has reviewed other technology developed in the early stages of cable television, such as the application of negative and positive traps, and more recent techniques, such as interdiction, to improve CATV systems.

A relatively recent technique for premium channel control is the interdiction system, so called because of the introduction of an interfering signal into a premium channel at the subscriber's location. Most embodiments consist of a pole-mounted enclosure located outside the subscriber's premises designed to serve one or more subscribers. This enclosure contains at least one microprocessor controlled oscillator and switch control electronics to secure several television channels. Control is accomplished by injecting an interfering or jamming signal into unauthorized channels from this pole-mounted enclosure.

For the sake of efficiency, it is known to utilize one oscillator to jam several premium television channels. This technique not only reduces the amount of hardware required, but also maximizes the system flexibility. The jamming signal frequency is moved as a function of time from channel to channel. The oscillator is frequency agile and hops from jamming one premium channel frequency to the next. Cable television channels and, of course, premium service channels may extend over a wide range of frequencies, for example, from 54 Mhz. up to and including 1000 Mhz. Thus, if only one oscillator were provided, it would have to be frequency agile over a wide range.

One such system, illustrated in U.S. Pat. No. 4,450,481 by Dickenson, has a single frequency agile oscillator which provides a hopping gain-controlled jamming signal output to four high frequency electronic switches. In this system, each switch is associated with one subscriber drop. Under microprocessor control and depending on which subscribers are authorized to receive transmitted premium programming, the microprocessor selectively gates the jamming signal output of the single oscillator via the switches into the path of the incoming broadband television signal to each subscriber. Consequently, an unauthorized subscriber upon tuning to a premium channel will receive the premium channel on which a jamming signal of approximately the same frequency has been superimposed.

A significantly more advantageous interdiction system is disclosed in U.S. Pat. No. 4,912,760 by West, Jr., et al. which controls a plurality of frequency agile oscillators for each subscriber. Each voltage controlled oscillator is allocated a continuous band of frequencies consistent with the elimination of jamming signal harmonics which could disturb authorized programming at a higher channel frequency. The interdiction apparatus includes generating and storing frequency control words for operating the voltage controlled oscillators consistent with a headend selected jamming factor for a particular channel to be jammed and addressably transmitted and stored premium programming authorization data. In U.S. application Ser. No. 07/476,041, filed Feb. 6, 1990, by West, Jr., et al., the method of programming the time slots of the West I system to vary the dwell time and jamming factor of the jamming signals for different premium channels was disclosed.

The system of West I and West II uses several variable frequency oscillators to cover the spectrum of the CATV broadband signal, in general from 54 Mhz. to 1000 Mhz. or higher. The lower frequencies of this spectrum are harder to cover because a normal oscillator covers less bandwidth at the lower frequencies. This has not been a significant problem in the past because the lower frequencies, usually channels 2-12, are VHF broadcast channels and supplied to the subscribers without restriction. The premium channels which required interdiction were higher in frequency and within the bandwidths of the several VCOs.

However, with the extension of CATV system bandwidth, initially about 330 Mhz, and then expanded to 550 Mhz, 750 Mhz, and now to 1000 Mhz. and above, the bandwidth of a small plurality of oscillators is again being taxed. Moreover, some CATV systems are placing premium channels in the VHF spectrum and some are using tiered service where VHF channels are becoming pay type viewing. To overcome the bandwidth expansion on both ends of the spectrum it would be advantageous for an interdiction system to be able to control more than one range of voltage controlled oscillator. Voltage controlled oscillators which are more efficient in one use than another because of their operation over a particular frequency range can be of different types. In addition to controlling different ranges of VCOs it would be advantageous for an interdiction apparatus to control different types of VCOs to provide system flexibility.

SUMMARY OF THE INVENTION

An interdiction apparatus comprises common circuitry which can be shared by one or more subscribers and a plurality of subscriber modules which are individually used for the interdiction of unauthorized channels of the broadband television signals for a particular subscriber.

The common circuitry comprises automatic gain and equalization control for regulating the level and frequency dependency of the broadband television signal. The common circuitry may also comprise a data receiver, a data decoder, and a control processor which can be individually addressed from a CATV system headend. The common circuitry decodes messages and data from the headend and generates commands and data for each of the subscriber modules.

The subscriber module incorporates special circuitry which may be implemented as an application specific integrated circuit (ASIC) to execute the commands and receive the data from the control processor. The primary function of the subscriber module is to generate jamming signals according to a programmed jamming pattern to interdict unauthorized channels in the broadband cable television spectrum for a particular subscriber.

In a preferred embodiment, each subscriber module comprises a master state machine, or specialized processor, which communicates with the control processor of the common circuitry to receive the commands and data. The master state machine executes the commands received from the control processor to generate command signals to other parts of the subscriber modules including a jamming state machine, another specialized processor. The jamming state machine controls the cyclic nature of the output of the jamming frequencies of a plurality of voltage controlled oscillators to provide a jamming pattern which can be individualized for each subscriber.

The jamming state machine controls a frequency control memory which stores a plurality of frequency control words which can be addressably read from memory and loaded into digital latches connected to the inputs of a plurality of digital to analog converters (DACs). The DACs convert the digital values of the latches to analog voltage outputs which are used to drive corresponding voltage controlled oscillators to produce the jamming signals. Several selected unauthorized channels are jammed by each VCO by changing the frequency control word in the corresponding DAC latch to cause the VCO to be hopped to the next frequency desired. The operation is accomplished by loading each latch on a sequential basis with the digital values of the frequency control words where each digital word represents a different jamming frequency and the timing of the changes define the hopping rate. The jamming state machine controls the cycle of blanking the VCO, loading a frequency control word into a particular DAC latch, and then unblanking the VCO to generate the jamming frequency chosen.

In the particular illustrated implementation, the interdiction apparatus includes four DACs, each having an input latch and generating an analog signal representative of a desired frequency. Each DAC is used to control the output frequency of one or more VCOs. The frequency control memory has associated with each DAC a memory segment of sixteen 10 bit frequency control words which can be loaded into the DAC latch on a timed basis. In general, the sequence is to load a DAC latch with a frequency control word from one of the sixteen frequency control word segments and thereafter sequentially load the other DAC latches with respective frequency control words from their segments before returning to change the frequency of the first latch. This operation permits an extremely rapid change of frequency or hop for all frequency generator combinations such that the spacing between frequency hops may be minimized. Because of the digital nature of the memory to memory transfer, the actual switching time between frequencies is substantially constant and does not have to depend on the hoping rate or the dwell time of each oscillator.

According to still another feature of the invention, the interdiction apparatus includes means for controlling the range of different VCOs and selecting types of VCOs.

For one aspect of the invention, the frequency control memory contains at least one extra mode control bit stored with each frequency control word. In this manner a frequency control word can include an address which is associated with a particular VCO. Preferably, in one embodiment the mode control bits are utilized by a switch control which blanks a first VCO of one range of frequencies while allowing the hopping of a second VCO with another range of frequencies depending upon the state of the corresponding mode control bit. In this manner the same set of frequency control words can be used to control one or more VCOs to provide different frequency ranges. In another embodiment, the mode control bits can be used to select the range of multiple range VCOs with their various states.

BRIEF DESCRIPTION OF THE DRAWINGS

These and other objects, features and aspects of the invention will be more clearly understood and better described if the following detailed description is read in conjunction with the appended drawings wherein:

FIG. 8B illustrates the function of the control bits generated by the apparatus of FIG. 8A

FIG. 19 is a pictorial representation of the frequency control memory for the jamming control illustrated in FIGS. 5A and 5B;

FIG. 20 is a pictorial representation of a continuous mode sequence for the generation of addresses for the random access memory illustrated in FIG. 5B;

FIG. 21 is a tabular and time representation of a random mode sequence for the generation of addresses for the random access memory illustrated in FIG. 5B;

FIGS. 26-29 are functional block diagrams of different types of voltage controlled oscillators which may be controlled by the switch control illustrated in FIG. 25;

DETAILED DESCRIPTION OF THE INVENTION

The improved interdiction method and apparatus of the invention will now be discussed in the context of the off-premises cable television channel interdiction system disclosed in U.S. Pat. No. 4,912,760 (West I) and U.S. Patent Application Ser. No. 07/476,041 (West II). While this system will be used as the context for disclosure of the invention, it should be realized that the invention is not to be limited to such configuration. It will be evident that the invention may find use in other systems for producing jamming or interference signals which are combined with information signals to render the information substantially unusable.

Figure 1:
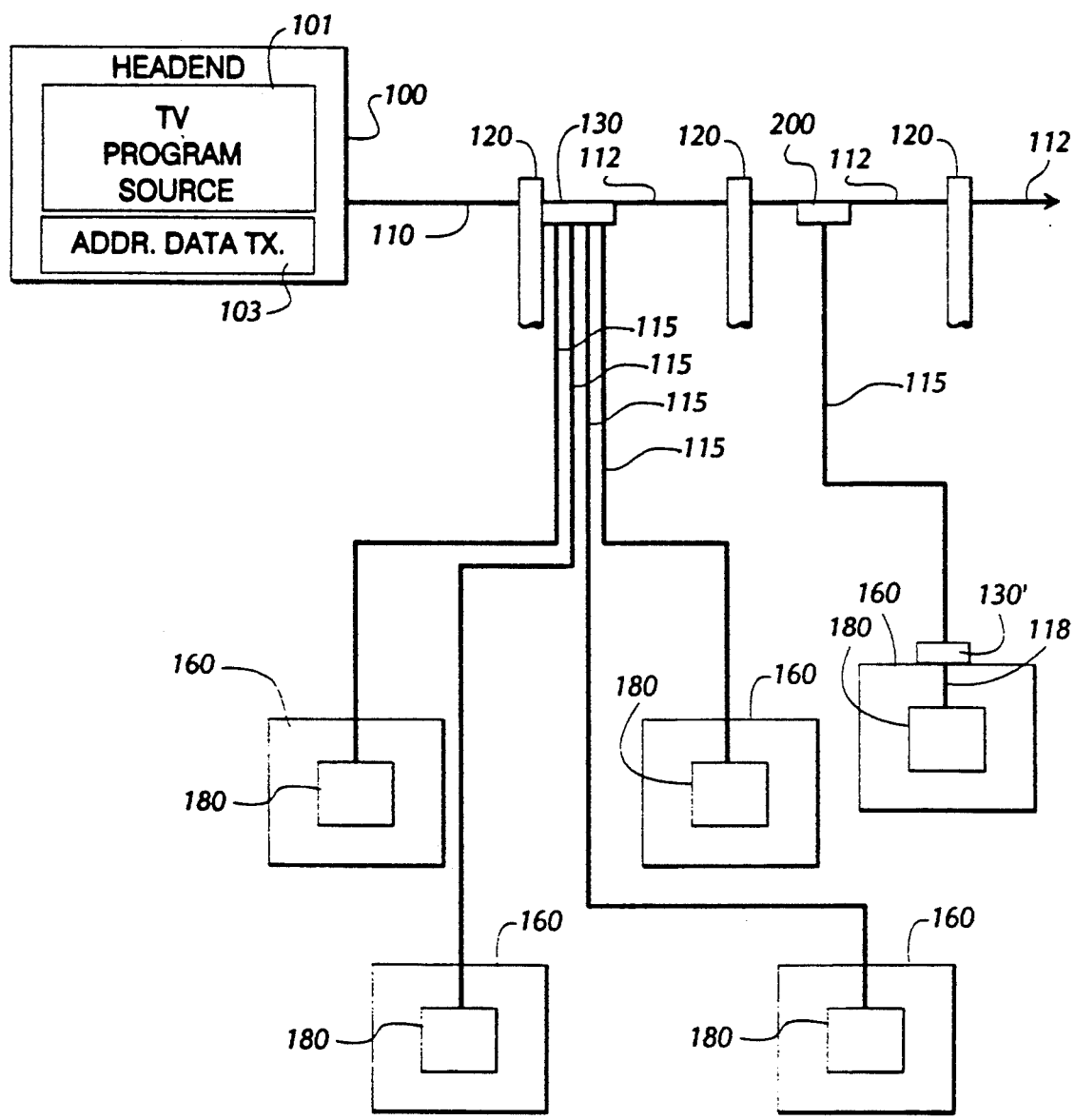
FIG. 1 is a system block diagram of an off-premises CATV system including a plurality of interdiction apparatus constructed in accordance with the invention.

Referring more particularly to FIG. 1, there is shown a general block diagram of an off-premises CATV system employing the principles of the present invention. The term cable television system is intended to mean all systems involving the transmission of television signals over a transmission medium (optical fiber cable, coaxial cable, over-the-air broadcast, or the like) toward remote locations. For example, a cable television (CATV) system may comprise a community antenna television distribution system, a satellite signal distribution system, a broadcast television system, a private cable distribution network, either industrial or educational, or other forms of such systems. Each remote location of a television receiver may comprise the location of a particular subscriber of a subscription television service, plural subscribers, single subscribers having plural television receivers, or private subscribers in a private cable distribution network. Consequently, the term subscriber may refer to either a private or a commercial user of a cable television system.

A headend 100 as used in the present application is defined as the central point for distributing television channels. The channels are then distributed to serving cables or trunks 110, over feeder lines 112, to drops 115, and finally to subscribers at locations 160. For reference purposes, an Electronic Industries Association (EIA) standard cable television frequency allocation scheme is employed and referred to herein; however, by means of the following disclosure of the present invention, one may apply the principles to other known standard or nonstandard frequency allocations. Furthermore, a National Television Subcommittee (NTSC) standard composite television signal modulated on a radio frequency carrier is generally considered in the following description; however, the principles of the present invention apply equally to other standard and nonstandard television signal formats.

Headend 100 includes a source of television programming, program source 101. Television program source 101 may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cables or trunks 110 and, subsequently, over the feeder lines 112 and the drop lines 115. Conventionally, the trunks 110, feeder lines 112, and drop lines 115 are constructed of coaxial cable. For higher performance, any one of these could be a fiber optic cable. Due to the cost of the installation but the need for a high quality initial transmission from the headend 100, the trunk lines 110 are typically the only lines constructed of fiber optic cable.

Program material provided by source 101 may be premium or otherwise restricted or secured from receipt at unauthorized receiver locations. The use of the term premium channel or premium programming is intended to mean a channel or program which is desired to be secured from unauthorized receipt either because of its premium or restricted status. In the past, most premium programming in cable television systems has been scrambled. However, in accordance with the present interdiction system, premium programming may be transmitted in the clear over the distribution system and interdiction is applied by off-premises interdiction apparatus 130, 130' to jam reception of unauthorized premium programming.

The interdiction apparatus can serve a single subscriber, such as apparatus 130'; or multiple subscribers, such as apparatus 130. While the interdiction apparatus 130 is shown as proximate to feeder 112 in the drawings, an interdiction apparatus may also be located in the distribution plant, on the subscriber's premises such as at 130', or at other locations as may be convenient. Desirably, all equipment may be removed from the subscriber premises. However, for the provision of additional services, some on premises equipment (not shown) may be unavoidable. For purposes of this description, however, subscriber premises 160 will be assumed to include at least one conventional cable ready television receiver 180.

Also, at the headend 100, there is normally an addressable data transmitter 103 for transmitting global commands and data to all subscribers, or local commands and data for reception by a unique subscriber. Such data transmissions may be conducted over a separate data carrier from the cable television spectrum, for example, at 108.2 Mhz. Global commands generally take the form of operation codes and data while local communications further include the unique address of a particular subscriber. Alternatively, such communications may take the form of in band signals sent within a television channel which are superimposed upon the audio carrier or which are in the vertical interval of the video signal.

In accordance with a cable television system provided with off-premises interdiction apparatus 130, 130', a housing is mounted on a strand supporting the feeder cable 112 to a pole 120 or in a similar manner. Inside the housing of interdiction apparatus 130, 130' is common circuitry for tapping into the broadband television and data transmission spectrum of the cable. Referring to the first pole 120 from the left of FIG. 1, there is shown a strandmounted apparatus serving four drops 115 to subscribers. Altogether, four subscribers and up to four drops 115 may be served by the off-premises interdiction apparatus 130. Besides the common circuitry, up to four (or more) plug-in subscriber control modules may be provided in one housing. For the interdiction apparatus 130', a tap 200 may be provided for connecting the drop 115 to the feeder 112. Also, if desired, additional services may be provided via other plug-in units in the housing such as impulse pay-per-view, subscriber polling involving two-way data communications, meter reading, energy management or other services.

Power for interdiction apparatus 130, 130', may be provided over the trunk 110 and feeders 112 from the headend 100 or be provided via the subscriber drop 115, or by a combination of such means. Alternatively, power may be even provided by means such as solar cells or other external sources, or by internal sources such as batteries. Interdiction apparatus 130, 130', may be secured in a tamper resistant housing or otherwise secured such as in a locked equipment closet of an apartment complex. If located in a place exposed to the elements, the housing should additionally be weather resistant and water-tight. Also, the housing should be designed to preclude radio frequency leakage.

Interdiction apparatus 130, 130' are uniquely addressable by headend 100. If two bits of a plural bit unique subscriber address are associated with uniquely identifying one plug-in slot for one of four subscriber control modules, common control circuitry may be uniquely addressed with remaining address data not used to secure the data communication. Just as premium programming is transmitted in the clear and since no data communication is necessarily required with a subscriber premises 160, a subscriber address need not be transmitted in a secure form.

Upon receipt of subscriber specific premium program or channel authorization data, the data are stored in a nonvolatile memory of the interdiction apparatus 130. Channel jamming circuitry associated with each subscriber control module jams unauthorized premium programming dropped via a particular drop 115 to a particular subscriber. Consequently, interdiction apparatus 130 is reasonably compatible with addressable authorization data transmission known in the art.

In this system no scrambling of the premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency, seek to tamper with the off-premises apparatus 130, 130', or derive a signal from shielded and bonded cable 112 which should likewise be maintained secure from radio frequency leakage. Consequently, the headend 100, cable television serving cables or trunks 110, feeder lines 112, drop lines 115, interdiction apparatus 130, 130', and television receivers 180 at subscriber premises 160 comprise a typical off-premises cable television interdiction system.

The interdiction apparatus 130 will now be described by means of the system block diagram of FIG. 2. For serving at least one, and up to four or more subscribers, subscriber control modules 134 (in accordance with the block diagram of FIG. 3) are provided in combination with common circuitry 132. The feeder cable 112 is shown entering interdiction apparatus 130 at a FEEDER IN terminal 136 and leaving at a FEEDER OUT terminal 138. At a tap 200, a directional coupler 202, which may be in the form of a plug-in module, taps into the broadband serving feeder cable 112. A broadband spectrum of CATV radio frequency signals is thereby output to a highpass filter 204 of common circuitry 132. Highpass filter 204 passes a band of frequencies comprising at least the data carrier frequency (or frequencies in a bi-directional application) and the CATV channel spectrum. The CATV spectrum presently comprises a frequency band from about 54 Mhz. to 1000 Mhz., which may be extended in the future.

The off-premises common circuitry 132 can be located at, or proximately to, the subscriber control modules 134 and are usually contained in the same housing. An automatic compensation circuit comprises variable gain devices 286, directional coupler 294, amplifier 299, and an automatic compensation control (ACC) 298. The automatic compensation control 298 includes an automatic gain control (AGC) which varies the amplitude of the broadband television signal by controlling the attenuation of variable gain devices 286 and an automatic slope control (ASC) which varies the amplitude of the broadband television signal with respect to frequency by controlling variable gain devices 286.

The automatic gain control of ACC 298 appropriately regulates the broadband RF signal power to fall within established limits. The AGC control thereby provides a common gain control for regulating the amplitude of the broadband of picture carrier signals received by all subscriber units. The incoming broadband picture carrier is regulated at this common point to fall within a range which is $-2.5$ dB to $+6.5$ dB from the jamming carrier but, as importantly, is fixed at a predetermined level so as to deliver a constant power level to the subscribers served. The predetermined reference level to which the incoming picture carrier is adjusted is set relative to the jamming carrier level so as to cause adequate interdiction without causing artifacts on the clear channels.

Referring again briefly to FIG. 1 and particularly to one of the premises 160, a minimum signal level of 0 Dbmv at the subscriber premises is required under Federal Communications Commission regulations. Considering a nominal drop line 115, the predetermined reference level of the picture carrier may be set at +3 Dbmv and the predetermined jamming level should be set at the subscriber modules 134 ideally at about +.5 to +9.5 Dbmv, or nominally at +5.5 Dbmv. Of course, if the drops are exceptionally short, for example, as are involved in residential subdivisions, apartment complexes, townhouse developments and the like, the predetermined picture carrier level and jamming carrier level may be adjusted accordingly.

Also connected to directional coupler 294 and amplifier 299 are a filter 207 and a data receiver 208 for receiving instructions and data from the addressable data transmitter 103 located at headend 100. Data receiver 208 receives the data transmitted, for example over a data carrier of 108.2 Mhz., and provides unprocessed data to an internal data decoder. In accordance with an established protocol, such data may be in the form of an operation code, a unique subscriber address and associated data. The data decoder of the receiver 208 processes the data and provides the transmitted data to a control processor 212 for further interpretation in accordance with a built-in algorithm. Preferably, processor 212 is a microprocessor. The received data may be stored in a nonvolatile memory 214 by the microprocessor 212. Instructions and data may be temporarily stored in memory 214 or more permanently stored and subsequently downloaded when needed to a subscriber control module 134 via an interface bus 201 connecting control microprocessor 212 with the separate subscriber control modules.

Control microprocessor 212 consequently interprets both global communications addressed to the common control circuitry 132 such as a command to set automatic gain control reference levels or communications addressed to unique subscriber control modules 134, or both. If appropriate, control microprocessor 212 ignores global or addressed communications to other interdiction apparatus 130. Examples of global communications specific to interdiction apparatus 130 are premium channel frequency data and jamming factor data for each premium channel or channels over which premium programming at a particular point in time is provided via headend 100. Examples of subscriber addressed communications include communications comprising premium channel or programming authorization information, communications instructing the interdiction apparatus to deny or provide service to a particular subscriber or communications comprising a number of selective jamming parameters.

Figure 2:
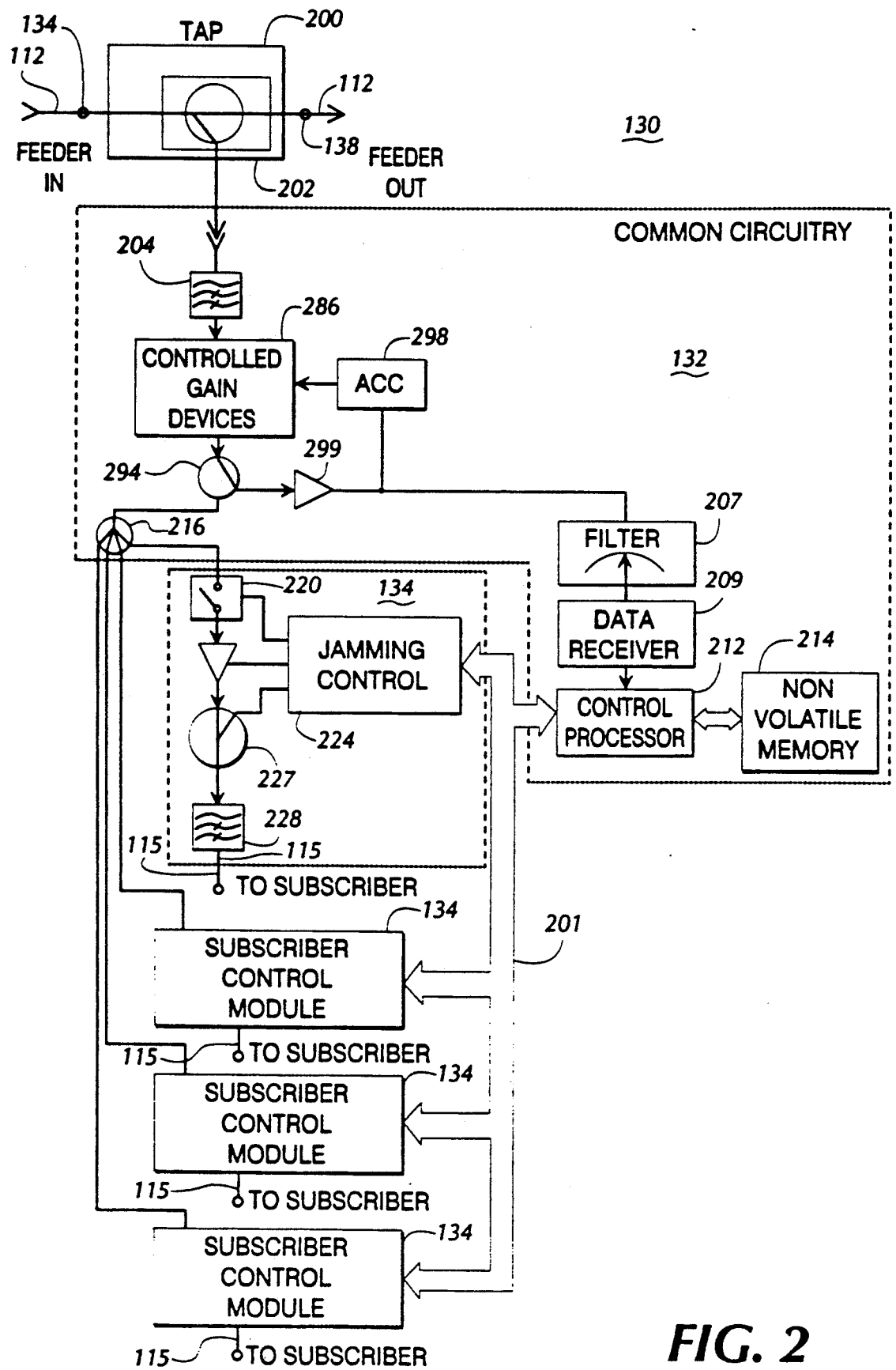
FIG. 2 is a detailed block diagram of one of the interdiction apparatus illustrated in FIG. 1 which includes common circuitry and one or more of the subscriber control modules.

If two way communications over the serving cable are anticipated, a data transmitter (not shown) may be provided in the common circuitry 132 of FIG. 2 or a separate telephone link from the subscriber location to the headend may be provided. Interface bus 201 may be a two way communications link by which subscriber control modules 134 may, at least, provide status reports to control microprocessor 212 upon inquiry.

RF power splitter 216 provides the compensated broadband radio frequency signals comprising at least the cable television spectrum separately to each subscriber control module 134 that is provided. If a reverse path is required for special additional services, a signal combiner (not shown) of a plug-in special service module (not shown) may be provided for receiving communications from each of the provided subscriber control modules 134 and transmitting the communications in an opposite manner to RF splitter 216. Certain data may be transmitted back toward the headend 100 via the special service plug-in module associated with the additional special service.

Jamming signals are introduced by the subscriber control modules 134 at a level approximately within a range of −2.5 dB to +6.5 dB or +2dB nominal of the video picture carrier power level of the unauthorized premium channel frequency to be jammed. They are most conveniently introduced for video carrier jamming approximately within a range of frequencies extending from just below the video carrier to +250 Khz. above the video carrier toward the audio carrier of the channel to be jammed. The frequency is selectable by the headend 100 and may be chosen to jam the audio carrier with a frequency closer to that carrier if desired. Also, the power level of the jamming signal may be selected from the headend 100 as well. Both the power level and frequency of the jamming signal may be intentionally varied via global communications transmissions if, for example, audio carrier jamming is desired. Such interdiction on a per channel basis between the video and audio carriers minimizes adjacent channel artifacts.

Depending on their number, the subscriber control modules 134 receive the compensated broadband RF television signal either directly from the directional coupler 294, or from one of the fan out lines of the power splitter 216. After compensation by the common circuitry 132, the broadband television signal flows through a controlled element 220, an amplifier 221 and a controlled element 226, and then to a highpass filter 228 before being provided to the subscriber drop line 115.

The controlled element 220 is a subscriber disconnect switch which is controlled by a jamming control 224 of the subscriber control module 134. In response to data received from the headend 100, the control microprocessor 212 commands the subscriber control module 134 to operate the switch 220. The switch of element 220 is opened to prevent any programming from being connected to the premises 160 of the subscriber or closed to provide authorized service. A dynamic disconnect function, where element 220 is switched on and off is further provided. A directional coupler 226 is provided to allow interdiction of premium channels of the broadband signal by combining it with jamming signals from the jamming control 224.

Figure 3:
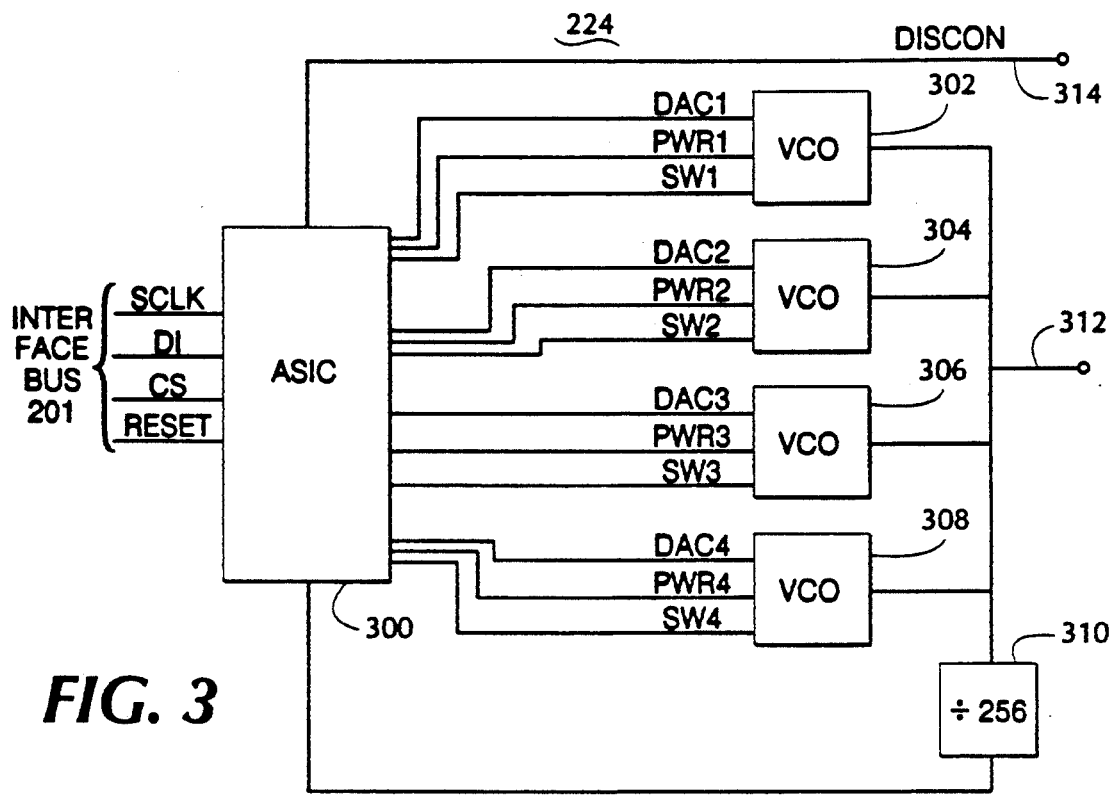
FIG. 3 is a detailed block diagram of one of the jamming controls for the interdiction apparatus illustrated in FIG. 2.

The jamming controls 224 of the subscriber control modules 134 are shown in more detail in FIG. 3 where a jamming apparatus 300, comprising an application specific integrated circuit (ASIC), controls a plurality of frequency agile oscillators 302, 304, 306, and 308 to produce the jamming signals from an output terminal 312. Each frequency agile oscillator is preferably a voltage controlled oscillator which receives a number of control signals from the ASIC 300. For example, the VCO 302 receives an analog voltage signal DAC1 to control the frequency output of the device. A power control signal PWR1 is also applied to the VCO 302 to connect or disconnect DC power supply. Additionally, a switch signal SW1 is applied to the VCO 302 to cause a blanking of the oscillator output, as will be more fully discussed hereinafter.

The ASIC 300 further outputs similar analog voltage signals DAC2, DAC3, and DAC4 to control the output jamming frequencies of the VCOs 304, 306, and 308, respectively. The power control signals PRW2, PRW3, PRW4 control the connection and disconnection of the DC power supplies of the VCOs 304, 306, and 308, respectively. In addition, the switching signals SW2, SW3, and SW4 control the blanking signals of the VCOs 304, 306, and 308, respectively. The combined jamming frequency outputs of the VCOs 302-308 produce the jamming signals from the terminal 312 which interdict the unauthorized channels of the broadband television signal. As discussed in West I and West II, the VCOs have different frequency ranges but, when taken together, cover the broadband cable television spectrum and combine to produce broadband jamming signals which can be used to interdict any unauthorized channels within that spectrum.

The ASIC 300 further generates the disconnect signal DISCON upon command of the control processor 212 of the common circuitry 132 and an indication whether the disconnect should be a static or dynamic operation. In addition, a calibration function for the jamming control 224 is assisted by a counter 310 which divides the frequency of a selected VCO by 256 to produce a frequency count input to the ASIC 300.

The ASIC 300 receives commands and data from the control processor 212 of the common circuitry over its interface bus 201 which comprises a serial clock line SCLK for timing, a data input line DI over which it receives the commands and data in a serial format, and a chip select line CS by which the control processor 212 can select between the different subscriber control modules 134 of the interdiction apparatus 130. The control processor 212 of the common circuitry also generates a reset signal RESET to the ASIC 300 to set particular registers within the chip to a default state.

Figure 5A:
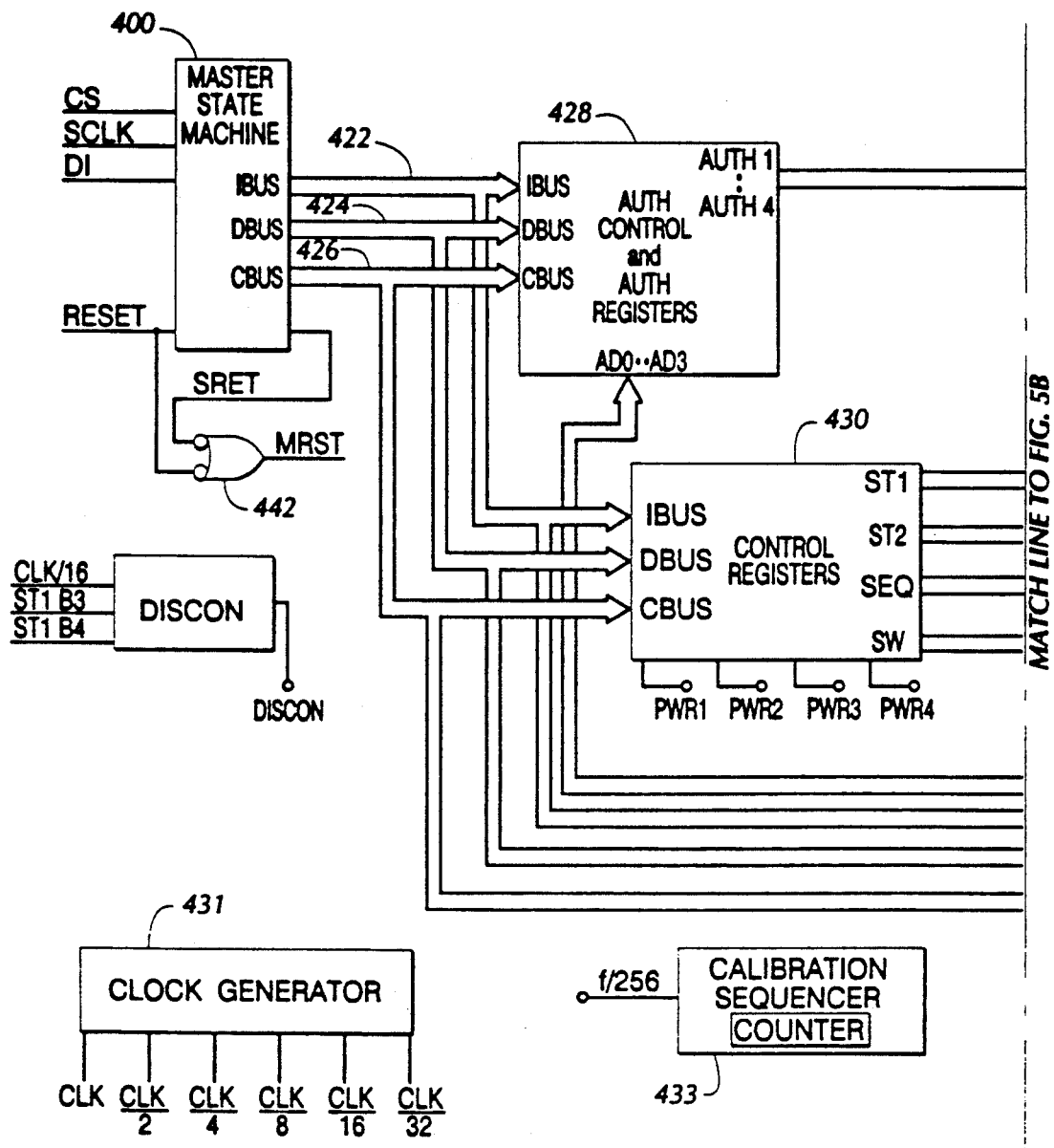
FIGS. 5A and 5B are detailed block diagrams of the application specific integrated circuit of the jamming control illustrated in FIG. 3.
Figure 5B:
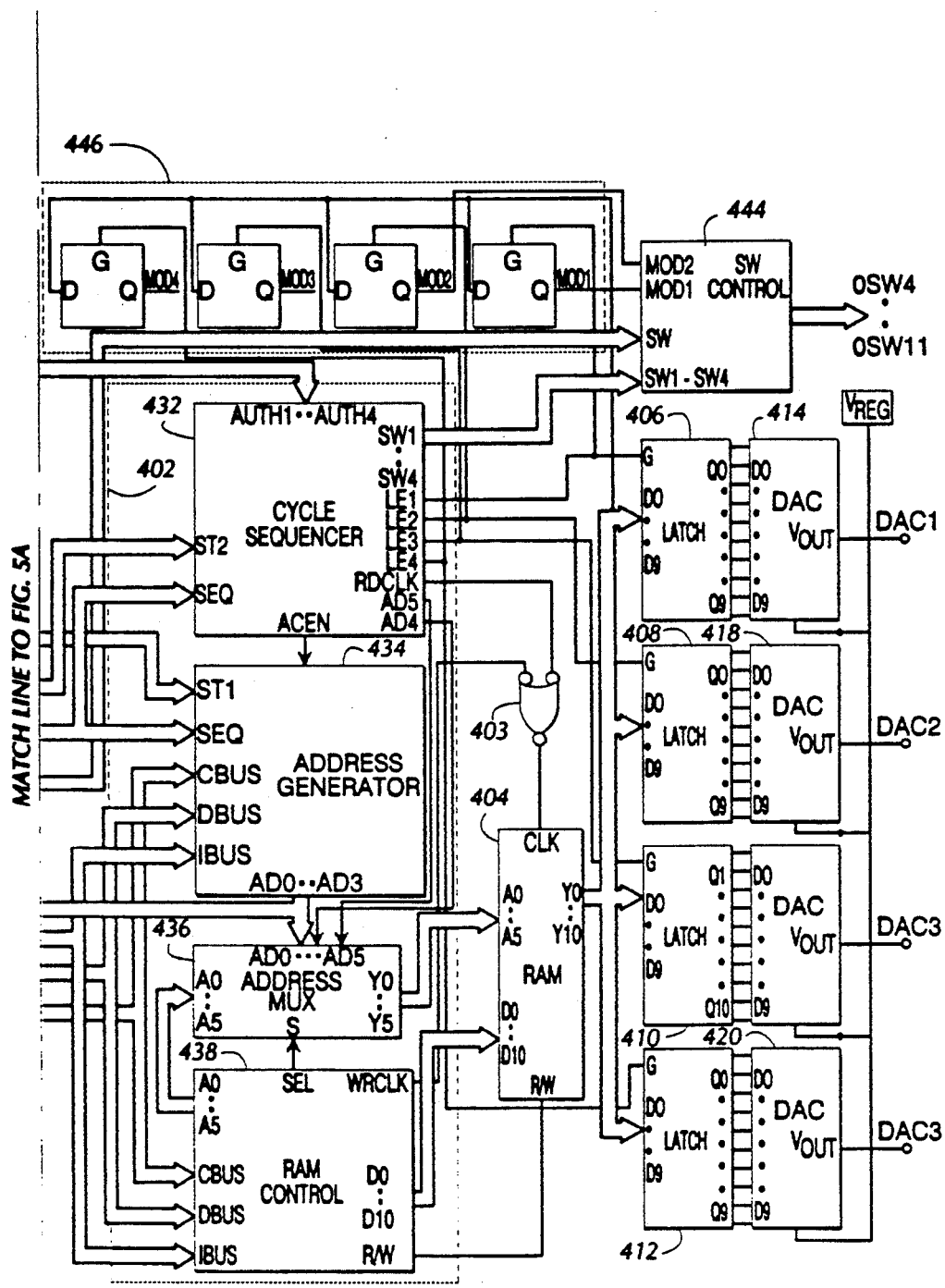

Each of the jamming controls 224 controls the plurality of frequency agile oscillators by means of the jamming apparatus 300 which includes the functional blocks illustrated in FIGS. 5A and 5B. The jamming apparatus (ASIC) 300 basically comprises two digital state machines 400, 402, or specialized digital processors, which coact to produce the control signals to the VCOs 302-308 at selected times and thereby generate the jamming signals. The state machine 400, 402 functionally operate a random access memory 404, a plurality of digital latches 406-412, and a corresponding group of digital to analog converters 414-420 in conjunction with the VCOs.

The operation of the ASIC 300 is to control the hopping of each VCO 302-308 to different jamming frequencies on a selected timed basis. The operation utilizes the RAM 404 as a frequency control memory, the latches 406-412 as frequency control word memories, and the DACs 414-420 and VCOs 302-308 to generate the jamming frequencies. The frequency control memory 404, in combination with the latches 406-412, the DACs 414-420, and the VCOs 302-308 thereby form four separate jamming frequency generators.

Figure 4:
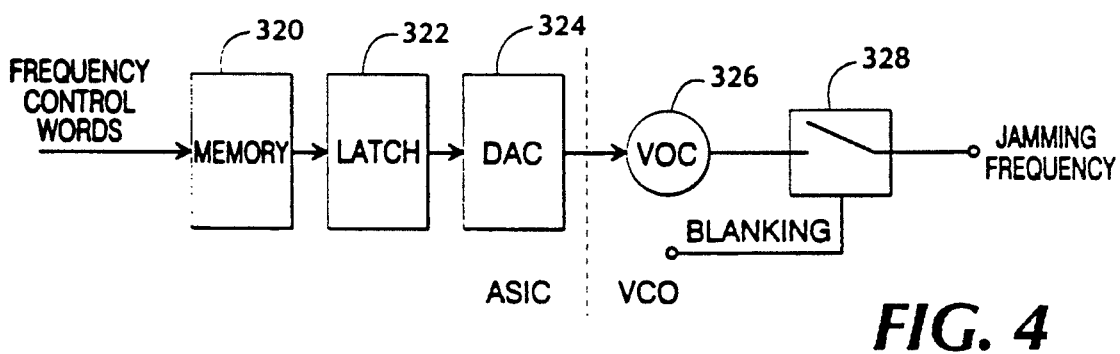
FIG. 4 is a functional block diagram of one of the frequency generator combinations of the jamming control illustrated in FIG. 3.

A functional block diagram of the frequency hopping operation of one of such jamming frequency generators is illustrated in FIG. 4. Normally, latch 322 is loaded with a digital word representative of the frequency desired to be output by the VCO 326. The DAC 324 has converted that digital representation into an analog voltage which controls the VCO 326 to the desired frequency. The switch 328 is closed and the VCO is generating the jamming frequency represented by the digital words stored in the latch 322. When a new frequency is to be generated, the VCO 326 is blanked by opening the switch 328. A memory to memory transfer is performed by moving a frequency control word representative of the new frequency from memory 320 to the latch 322. The DAC 324 converts the new digital word to an analog voltage which controls the VCO 326 to generate the new frequency. The latch, DAC, and VCO combination is then allowed to settle at the new frequency. The VCO 326 is thereafter unblanked by closing the switch 328 to generate the new frequency.

The master state machine 400 receives commands and data from the control processor 212 of the common circuitry and decodes the commands to produce instructions, control signals, and data to other portions of the jamming apparatus including the jamming state machine 402. In addition to the two state machines 400, 402, the jamming apparatus 300 includes the RAM 404 which acts as a frequency control memory to store sixty-four 11 bit digital words, hereinafter termed frequency control words. The bits of each word are indicative of a desired jamming frequency for one of the VCOs and the last bit is a mode control bit. The frequency control memory 404, as is illustrated in FIG. 19, comprises four blocks of 16 frequency control words. The first 10 bits are the frequency control word and the last bit is the mode control bit.

The frequency control words are read from RAM outputs Y0-Y10 in a sequence under control of the jamming state machine 402 and 10 bits are loaded into one of the plurality of latches 406-412 while 1 bit is latched in an associated mode control latch of mode control register 446. Each of the latch outputs Q0-Q9 drive the data inputs D0-D9 of one of the corresponding digital to analog converters 414-420. The digital to analog converters 414-420 in turn generate the analog control voltages DAC1-DAC4 from their outputs $V_{out}$ for the VCOs to generate jamming signals having frequencies selected by the frequency control words. The VCOs output their jamming signals on the jamming control line which are then used to interdict the particular channels not authorized for viewing from the broadband television signal.

The jamming cycle continues by waiting for a particular dwell time and then by reloading the DAC latches 406-412 with new frequencies control words to hop the VCOs to the next selected frequency. The jamming cycle is under control of the jamming state machine 402 which generates the control signals to blank the VCOs, address and read the memory 404, load the latches 406-412 and mode control register 446 with the frequency control words and mode control bits, and then unblank the VCOs 302-308 to generate the jamming signals. Preferably, the jamming state machine 402 is under the supervisory control of the master state machine 400 during the changing of its states or modes, but it generally operates as an independent sequential processor to generate the jamming pattern stored in the frequency control memory 404 for the particular subscriber. In accordance with one of the aspects of the invention, the jamming pattern and other jamming parameters can be addressably programmed via the master state machine 400.

The master state machine 400 communicates with the jamming state machine 402 and controls the states and modes of that processor by outputting instructions on an instruction bus (IBUS) 422 to selected portions of the jamming state machine. Further, data is output from the master state machine 400 on a data bus (DBUS) 424 to various parts of the jamming state machine 402. The timing, control and sequence of reading the data and executing the instructions are controlled by a plurality of control signals output from the master state machine 400 on a control bus (CBUS) 426. The IBUS 422, the DBUS 424, and the CBUS 426 are further inputs to an authorization control and authorization register circuit 428, and a control register circuit 430. These circuits 428, 430 communicate with the master state machine 400 and provide control and status signals for the jamming state machine 402 and a switch control 444 via a plurality of buses. The authorization control and authorization registers 428 provide authorization signals AUTH1-AUTH4 to a cycle sequencer 432. The control registers 430 provide status buses ST1, ST2 and a sequence bus SEQ to the jamming state machine 402 and a switch bus SW to the switch control 444.

In this manner, the master state machine 400 controls the modes and operations of the jamming state machine 402 by writing data and other status information to four 8-bit control registers 430 including the two status registers ST1, ST2, a sequence register SEQ, and a switch register SW and a group of authorization registers AUTH1-4. The authorization registers 428 are a group of four 16-bit registers which in their 64 memory locations store whether the corresponding frequency control words should be loaded into the particular DAC latches during a jamming cycle. The control registers 430 including the status registers are used to determine different jamming parameters including specific jamming modes such as random mode, continuous mode, or pulsed mode. The sequence register SEQ stores the variables for the hopping rate.

The jamming state machine 402 comprises a cycle sequencer 432, an address generator 434, an address multiplexer 436, and a RAM control 438. In general, the RAM control 438 generates control signals for controlling the address multiplexer 436 to either select an address for the random access memory 404 from the cycle sequencer 432 and address generator 434, or from data received over the data bus by the RAM control 438. In this manner, the RAM control 438 is adapted to write frequency control words into the random access memory 404 or allow the cycle sequencer 432 and address generator 434 to read frequency control words out of memory for jamming cycles.

The cycle sequencer 432 and address generator 434 generate respectively the block addresses AD4, AD5 of the memory 404 and the lower order 4 bits of the address, AD0-AD3, which select the one of sixteen frequency control words from a memory block and the read clock signal RDCLK. The cycle sequencer 432 also generates the load enable signals LE1-LE4 which cause the frequency control words which are read out of the RAM 404 to be loaded into one of the four DAC latches 406-412. Further, the cycle sequencer 432 generates the switch signals SW1-SW4 which control the timing of the switching for blanking the VCOs 302-308.

The master state machine 400 generates a master reset signal MRST to all the registers and counters in the system to allow them to initiate in a predetermined state upon power up or a reset condition. The master reset signal is generated by OR gate 442 as the logical combination of either the set/reset signal SRET from the master state machine 402 or the reset signal RESET from the control processor 212 of the common circuitry.

The master state machine 400 further controls the status of the disconnect switch for each subscriber control module via a disconnect control 440 which generate the signal DISCON. The disconnect control 440 receives a high frequency clock signal CLK/16 for generating a dynamic disconnect signal. The status bits, B3, B4 from the status register ST1 determine whether the disconnect is static or dynamic and uses the clock signal CLK/16 to switch the disconnect switch at high speed.

The blanking of the VCOs 302-308 is accomplished by a switch control 444 which outputs the blanking signals OSW11-OSW4. The blanking signals of the switch control 444 are basically the timed switch signals SW1-SW4 from the jamming state machine 402 logically combined with the switch register control bits SW0-SW7 and the mode control bits MOD1, MOD2 from the mode control register 446. The switch register bits and mode control bits allow the switch control 444 to blank different types of VCOs and VCOs with different ranges with the switch signals SW1-SW4. The jamming apparatus 300 further includes a clock generator 431 to provide a plurality of timing signals based upon a constant clock CLK which are used to synchronize operations between sections of the chip. The apparatus 300 also contains a calibration sequence 433 which can be used to calibrate a frequency control word in memory 404. The calibration sequencer receives the count signal f/25.6 from the output of one of the oscillators and produces a count of the actual frequency so that it can compare it with a desired frequency in the manner described in West I and West II. Because the calibration function does not form part of the present invention, the connections and operation of the calibration sequencer 433 have not been shown or described herein.

Figure 6:
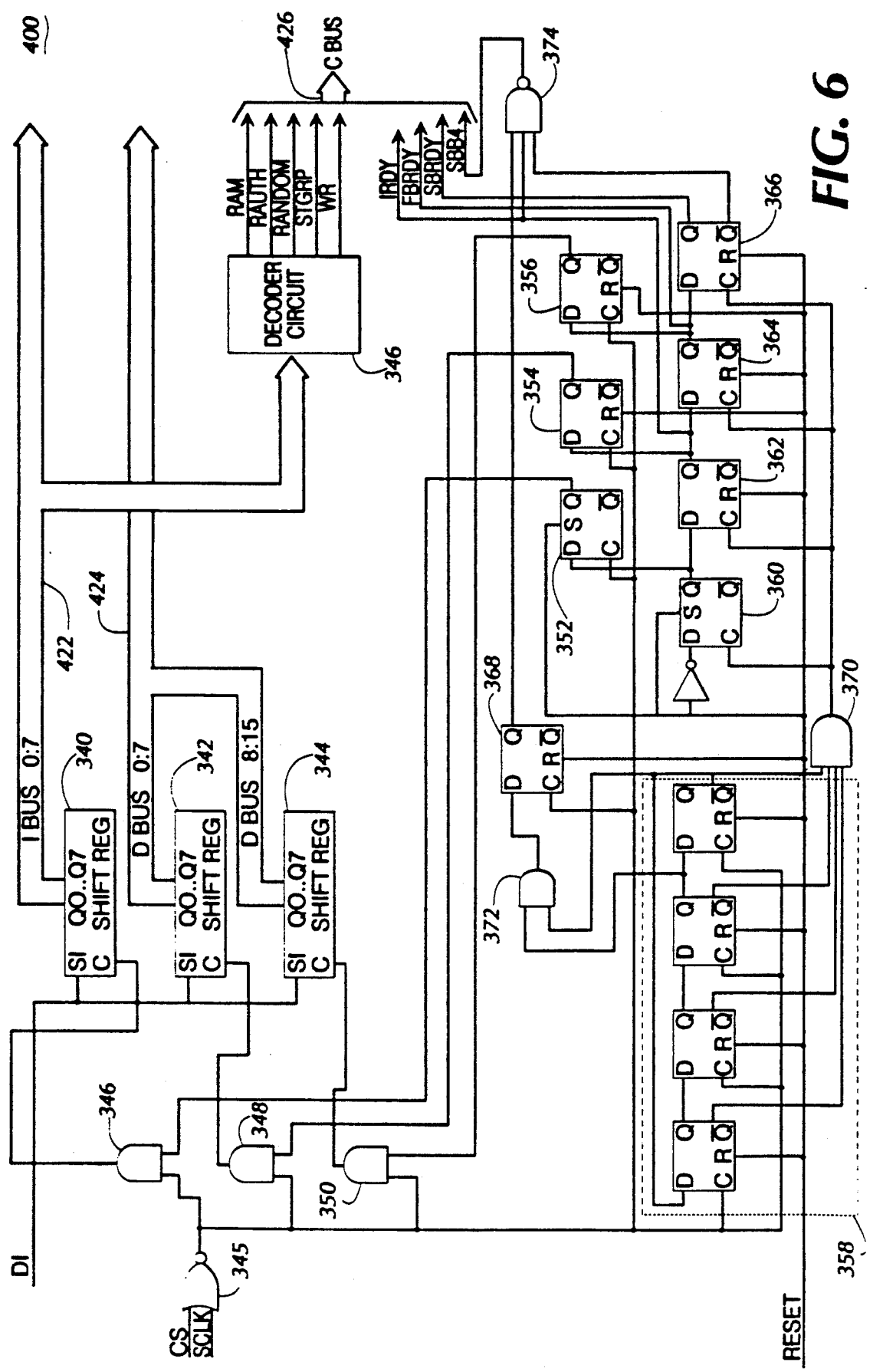
FIG. 6 is a detailed electrical schematic of the master state machine illustrated in FIG. 5.

FIG. 6 illustrates the detailed circuitry of the master state machine 400. The circuitry comprises a communication circuit comprising three shift registers 340, 342, and 344 which receive serial data from the control processor 212 of the common circuitry from the data input line DI. The shift register 340 is the instruction register and shift registers 342 and 344 are the first data byte and second data byte registers, respectively. The control processor 212 communicates and commands the status and operation of the jamming apparatus 300 via information stored in these registers. The format of a communication from the control processor 212 is a one byte command followed by one or more bytes of data. The commands and data are clocked into the shift registers 340-344 in synchronism with the serial clock SCLK provided to a NOR gate 345. The chip select signal CS from the control processor 212 of the common circuitry enables the serial clock to be transmitted through NOR gate 345 to a plurality of clock control AND gates 346-350. The AND gates 346-350 are further enabled by a timing control comprising bistables 352-368 and AND gates 370, 372.

The sequence of loading the shift registers 340-344 with a command and data from the control processor 212 includes enabling the master state machine 400 with the CS signal and synchronously transmitting the first command byte on the data input line DI. This causes the NOR gate 345 to produce a clock signal to the AND gate 346 whose output is applied to the clock input of the instruction shift register 340. At the same time, an enabling signal from the Q output of the bistable 352 is applied to AND gate 346 to allow the clock signal to load the register 340 with the instruction. After the bistables 358, AND gate 370, and the bistable 362 decode that the shift register 340 has loaded 8 bits by counting the clock signals, the instruction ready signal IRDY is generated from the Q output of bistable 362.

This action further resets the bistable 352 and causes bistable 354 to set on the next serial clock pulse. Resetting bistable 352 disables the clock through AND gate 346 and enables the clock through AND gate 348 to the clock input of the first byte register 342. At the end of another 8 bits, the first byte ready signal FBRDY is generated from the Q output of bistable 364 and bistable 354 is reset, disabling the clock through AND gate 348. On the next clock pulse, bistable 356 is set to enable the serial clock through AND gate 350 to the clock input of the second byte register 344. When another 8 bits have been loaded into the second byte register 344, the second byte ready signal SBRDY is generated from the Q output of the bistable 366 and bistable 356 reset.

The instruction and its data byte, or bytes, are then stored in registers 340, 342, and 344 and await to be executed by the jamming state machine 402 or other parts of the apparatus 300. The parallel outputs Q0-Q7 of registers 342 and 344 become bits 0-15 of the DBUS 424. The parallel outputs Q0-Q7 of the instruction shift register 340 become the instruction bits 0-7 of the IBUS 424. Within the master state machine 400 some instructions on the IBUS 424 are decoded with timing signals by decoder circuit 346 to produce a number of control signals. The signal output from the decoder circuit 346 when combined with the timing signals from the timing circuit form the CBUS 426.

The control signal IRDY indicates that an instruction is ready to be read from the IBUS 422. The control signal FBRDY indicates that the first byte 0:7 of the DBUS 424 is available for reading by other parts of the jamming apparatus. Similarly, the control signal SBRDY indicates that the second byte of the DBUS 424 is ready for reading. The control signal RAM indicates that the data on the DBUS 424 should be stored to the random access memory 404. The control signal RAUTH indicates that the data on the DBUS 424 should be stored in the authorization registers of authorization control 428. The control signal STGRP indicates that the data on the data bus should be stored to the control registers 430. The control signal WR indicates that a write function for the data on the data bus should be written to a directed register. The control signal SBB4 indicates that the first four bits of a particular data word has been received.

Figure 7:
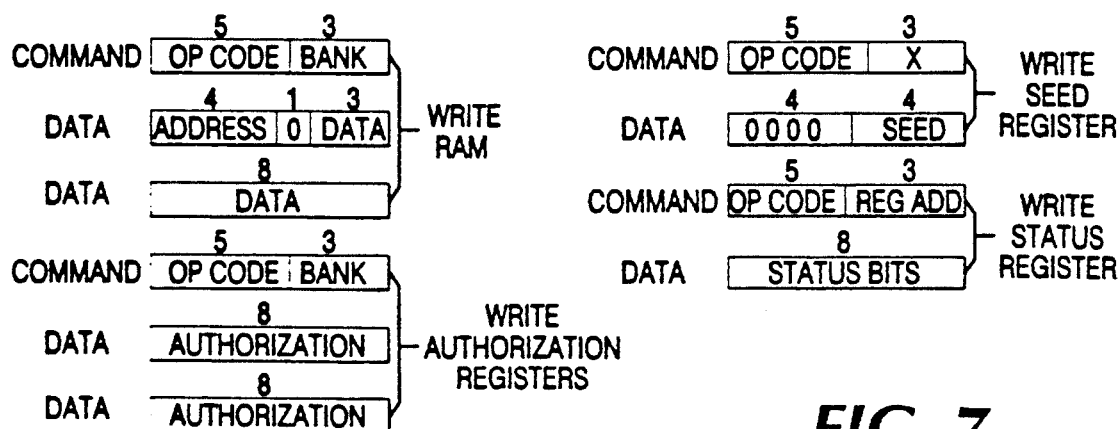
FIG. 7 is a pictorial representation of the commands and data which are generated by the common circuitry for communication to the subscriber modules illustrated in FIG. 2.

FIG. 7 illustrates the communications which cause the illustrated control signals to be generated. The communications which are germane to the invention are processor write instructions which cause data from the control processor 212 to be written to a register or memory locations to vary the jamming parameters of the jamming state machine 404. Specifically, a WRITE RAM instruction will store a frequency control word and associated mode control bits into RAM 404. A WRITE AUTHORIZATION REGISTER instruction will store 16 bits of authorization data for a block of RAM 404 into a selected authorization register. A WRITE SEED REGISTER instruction will load a seed count into a random seed register. A WRITE STATUS REGISTER instruction will change the status data in the selected registers.

In this manner the master state machine 400 can communicate with the control processor 212 to receive instructions and data. The master state machine 400 thereafter causes the execution of the instructions by changing the described registers to vary the jamming parameters of the jamming state machine 404.

Figure 8A:
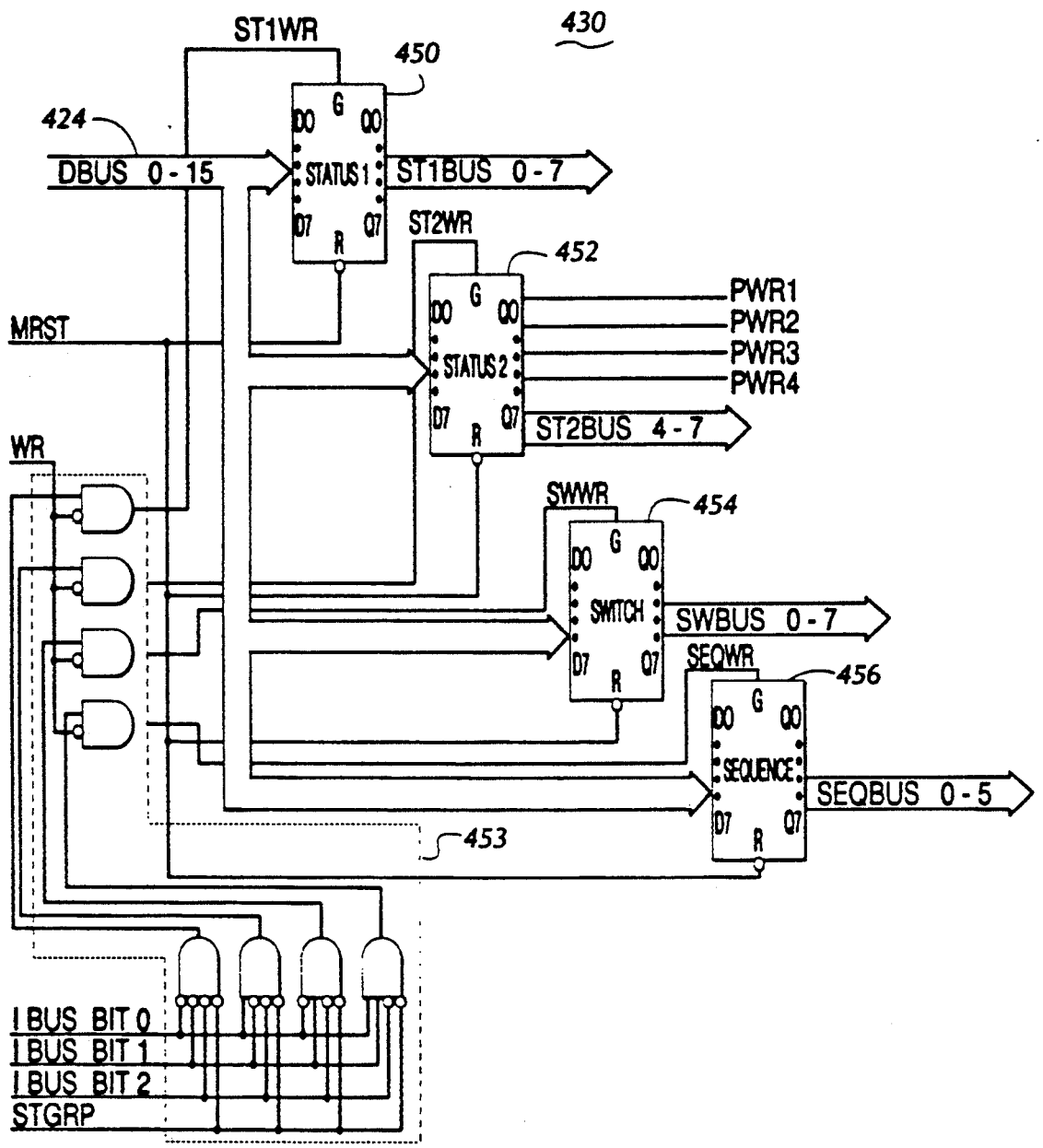
FIG. 8A is a detailed electrical schematic of the control registers illustrated in FIG. 5.

FIG. 8A is a detailed electrical schematic of the control registers 430 which provide control and status information for varying the modes and operation of the jamming state machine 402. The control registers comprise a pair of 8-bit status latches 450, 452, an 8-bit switch latch 454 and an 8-bit sequence latch 456. Upon decoding the specific write status register commands with circuitry 453 to enable the latches, the data on the DBUS is latched into one of the latches 450-456. The particular functions of the control bits are shown in the accompanying tables in FIG. 8B. The Q0-Q7 outputs of latch 450 are the status bus ST1. The Q0-Q3 outputs of the latch 452 are the power control signals PRW1-PRW4 of VCOs 302-308. The outputs Q4-Q7 of latch 452 are the status bus ST2. The outputs Q0-Q7 of latch 454 are the switch bus SW. The outputs Q0-Q5 of latch 456 are the sequence bus SEQ. The jamming parameters which are varied by the control registers for the preferred embodiment are the jamming mode, the jamming cycle duration, the operation of the switch control, and the operation of the disconnect control. BITS 0, 1, 2 of the sequence register 456 control the jamming mode by selecting whether it is continuous, random, or pulsed mode. If pulsed, mode Bit 2 selects between half and quarter mode and Bits 5, 6 of the status register ST1 450 select the duration of the pulsing. Bit 5 of the status register ST2 452 and Bits 3, 4, and 5 of the sequence register 456 select the duration of the jamming cycle. Bits 0-7 of the switch register 454 controls the switch control and Bits 3, 4 of the status register ST1 controls the disconnect control.

Figure 9:
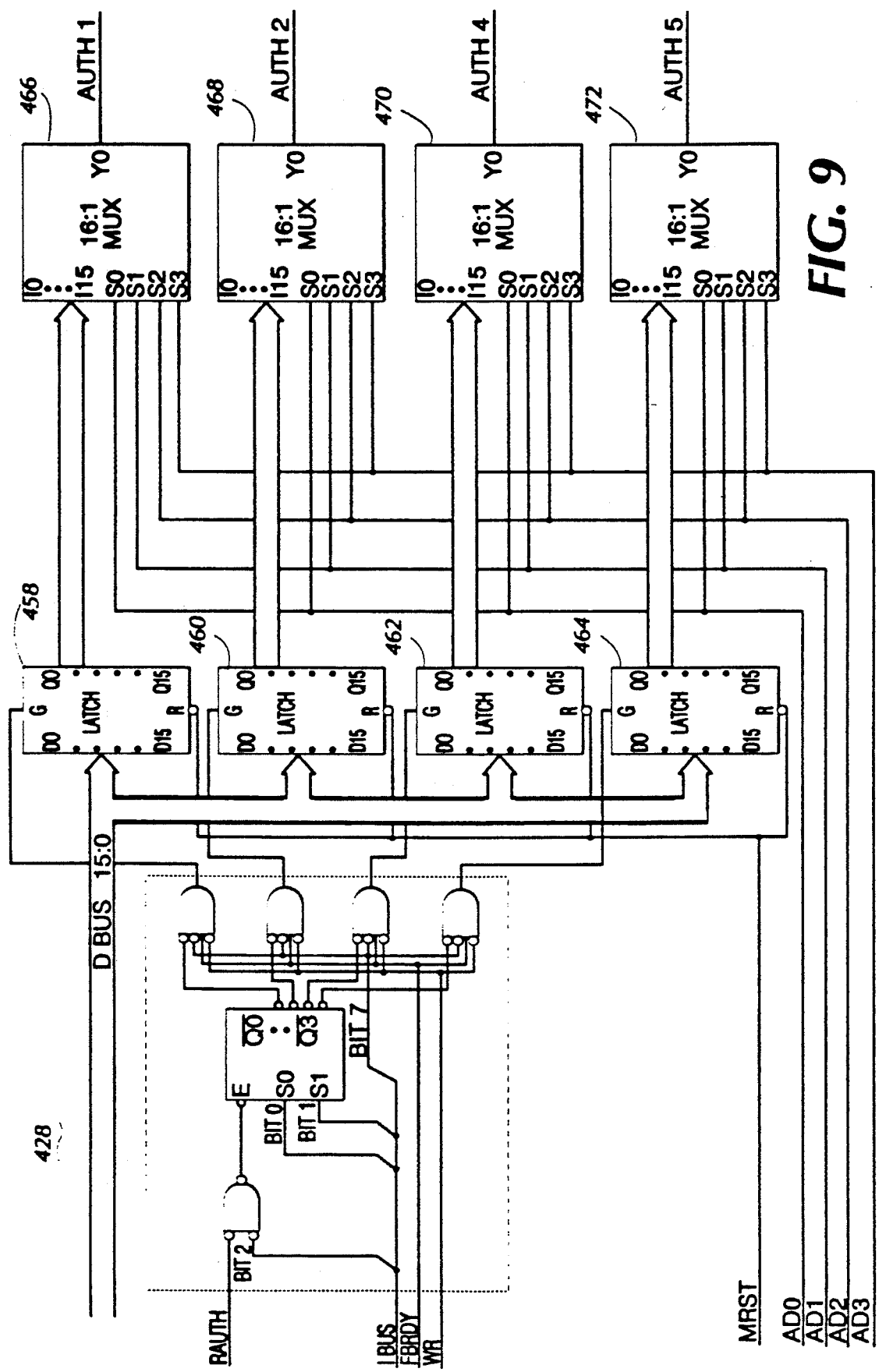
FIG. 9 is a detailed electrical schematic of the authorization control and authorization registers illustrated in FIG. 5.

The authorization control and authorization registers 428 are more fully illustrated in FIG. 9. There are four authorization registers 458, 460, 462, and 464 which comprise 16 bit latches which are loaded from the DBUS by the control lines of the master state machine 400 via decoding circuitry 457. When the master state machine 400 generates a write authorization register signal RAUTH and a write signal WR, the 16 data bits received with the instruction are latched into one of the respective registers from the DBUS 424. A decoder 457 decodes the block address from the IBUS and generates four enable outputs to the latches 458-464. Thus, each of the registers 458-464 each stores 16 bits corresponding to the 16 frequency control words of separate blocks of the RAM 404.

The authorization control uses the control bits and the lower order address AD0-AD3 to generate the authorization signals AUTH1-AUTH4. The latch outputs Q0-Q15 of the registers 458-464 are input to the demultiplexing terminals I0-I15 of multiplexers 466-472, respectively. The addresses AD0-AD3 from the address generator are coincidentally applied to the select inputs S0-S3 of the multiplexers 466-472 to select 1 of 16 of the authorization bits from each latch. This generates four authorization signals AUTH1-AUTH4 from the Y0 outputs of the multiplexers 466-472 which correspond to the state of the authorization bit for the presently addressed location of each block of memory.

The control processor 212 may then program the authorization registers 458-464 with authorization data to control whether a specific frequency control word is enabled for loading into a DAC latch or is inhibited for such operation. Because of the communications between the headend 100 and the control processor 212, this function is additionally addressable from the headend.

The cycle sequencer 432 of the jamming state machine 402 will now be more fully explained with reference to FIGS. 10A and 10B. The cycle sequencer 482 controls the transfer of the frequency control words from memory 404 into the DAC latches 406-412 and the overall timing of the jamming cycle. To accomplish this function it generates the read RAM clock signal RDCLK for reading the frequency control words from the RAM 404 and a count enable signal ACEN to increment the cycle of the address generator for the lower order addresses AD0-AD3. The cycle sequencer 432 further generates the RAM addresses AD4, AD5 which select which block of the RAM 404 is addressed. The cycle sequencer 432 further generates the load enable signals LE1-LE4 which select 1 of 4 DAC latches to be loaded. In combination with the load enable signals LE1-LE4, the cycle sequencer 432 generates the switch signals SW1-SW4 which control the blanking of the particular VCOs while they are being changed in frequency.

The overall operation of the cycle sequencer 432, as better illustrated in FIG. 12a and FIG. 12b, is to select the VCO which is to be changed in frequency with the RAM addresses AD4, AD5, one of the load enable signals LE1-LE4, and one of the switch signals SW1-SW4. In combination with the address generator 434 which generates the address in the particular block to be chosen, the cycle sequencer 432 then begins a frequency control word change or blanking cycle. The frequency control word change cycle consists of blanking (opening) the selected VCO switch associated with the DAC latch to be loaded with the switch signal SW to allow the jamming energy of the VCO to dissipate before a change is made. The new frequency control word is then read from memory 400 and loaded into the DAC latch with the latch enable signal LE and a wait cycle is entered until the DAC and the VCO have settled. The particular VCO switch is then unblanked (closed) with the switch signal SW and the cycle continues for a dwell time during which the VCO generates the frequency. After the dwell time, the cycle repeats by changing the frequency control word and hopping the VCO to a new frequency.

The cycle sequencer 432 generates these signals by first outputting the load enable signals, LE1-LE4 from NAND gates 476-482. The outputs of NAND gates 476-482 are the logical coincidence of two input signals. The first signal is one of the authorization signals AUTH1-AUTH4 which indicates that the addressed frequency control word in the selected RAM block is either to be selected or skipped. I a respective authorization signal to a NAND gate is low, no load enable signal will be given to the corresponding DAC latch and the addressed frequency control word will be skipped. The present time slot will jam the same channel as the previous time slot because the frequency control word in the DAC latch will remain the same. The second signal is one of the timing signals T1-T6 from AND gates 484-494 which decode the states of a synchronous counter 496.

The switch signals SW1-SW4 are generated by the $\overline{Q}$ outputs of four RS-type bistables 498-504. The bistables 498-504 are set and reset by the output of AND gates 506-520. A coincidence of two signals on the inputs of AND gates 506, 510, 514 and 518 sets the bistables 498-504, respectively, and a coincidence of two signals on AND gates 508, 512, 516 and 520 resets the bistables 498-504, respectively. The set signals for AND gates 506, 510, 514 and 518 are the coincidence of the timing signals T1-T6 from AND gates 484-494 and a fixed duration pulse from the $\overline{Q}$ output of a D-type bistable 497. The reset signals for AND gates 508, 512, 516 and 520 are the coincidence of timing signals T1-T6 from the AND gates 484-494 and a fixed duration pulse from the $\overline{Q}$ output from a D-type bistable 499.

Figure 10A:
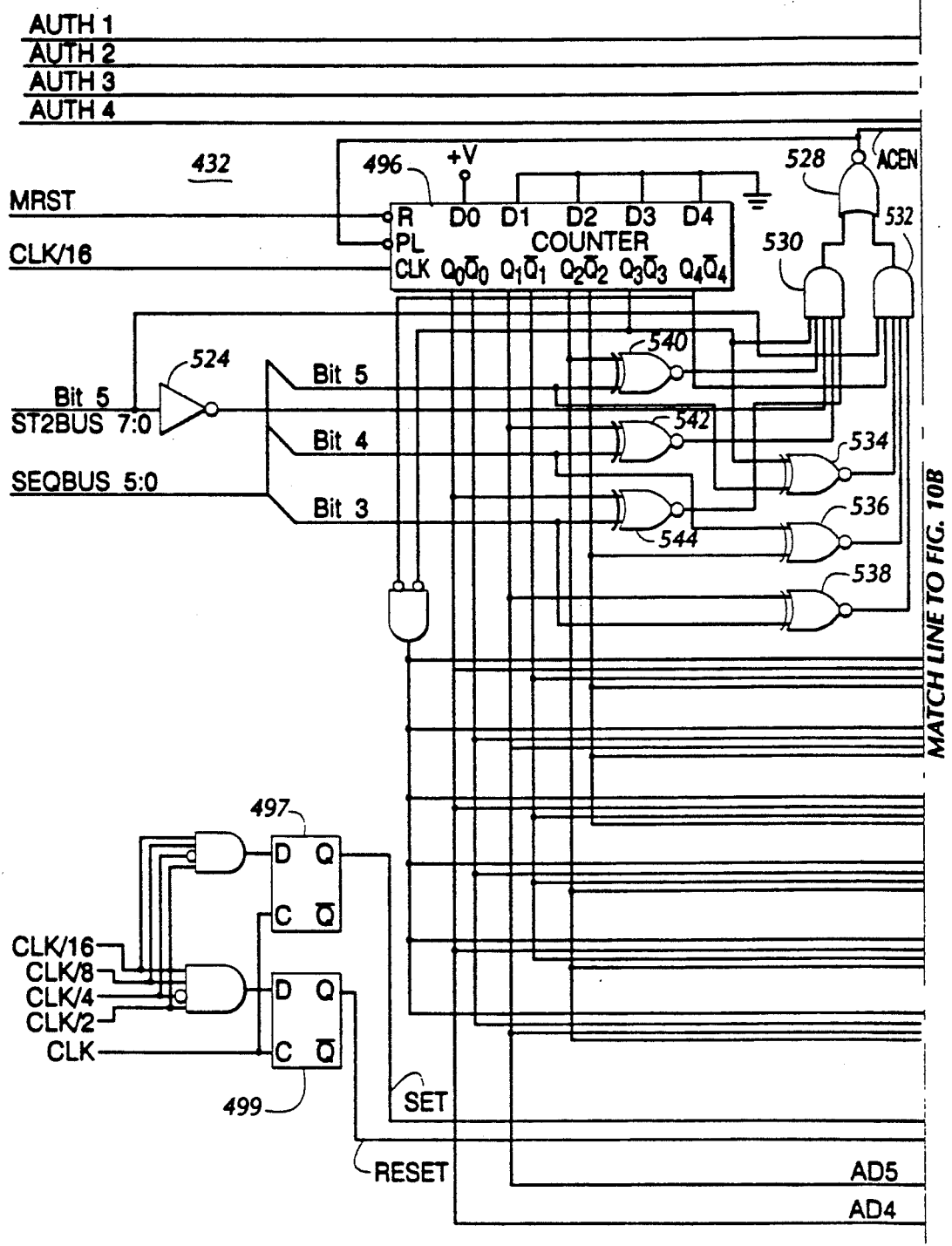
FIGS. 10A and 10B are detailed electrical schematic of the cycle sequencer illustrated in FIG. 5B.
Figure 10B:
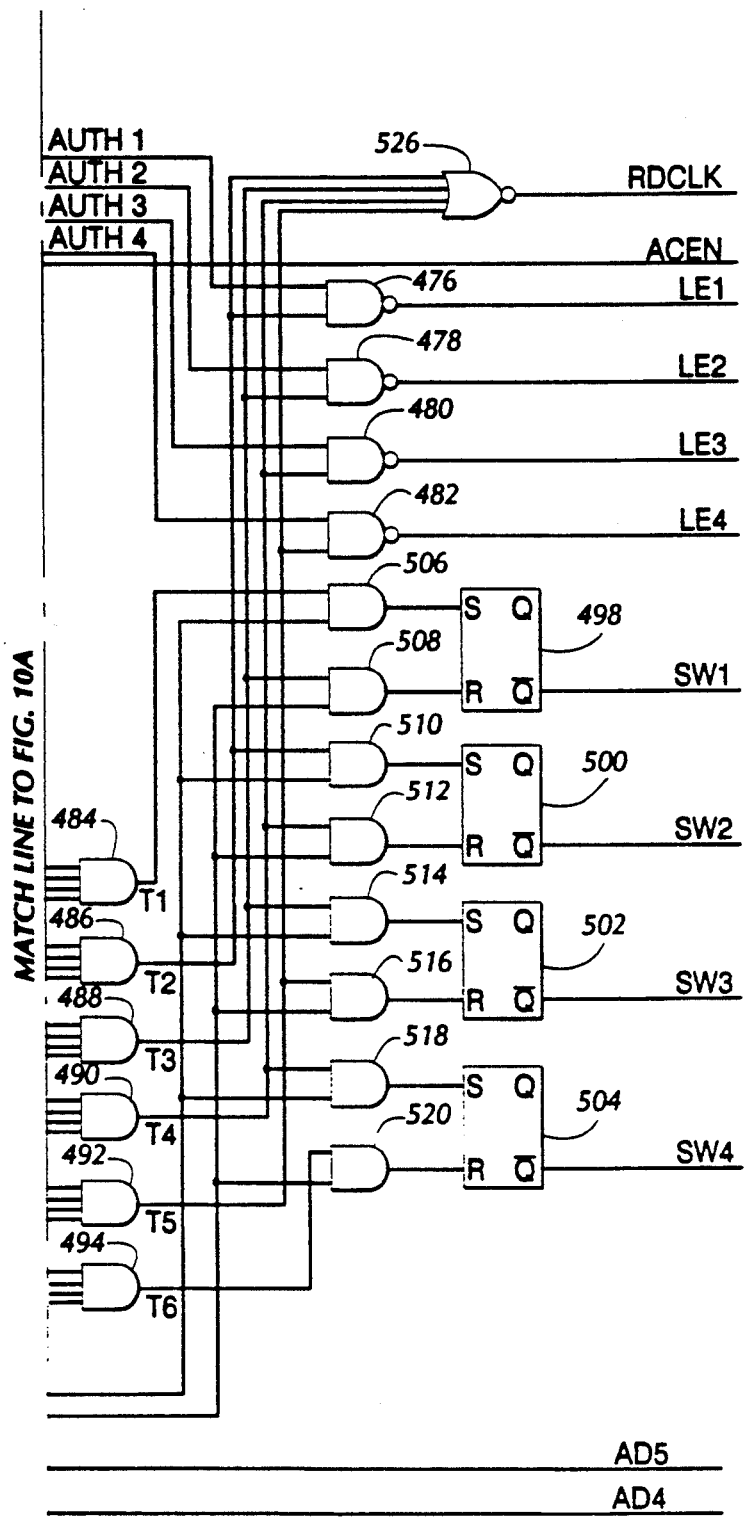
Figure 15:
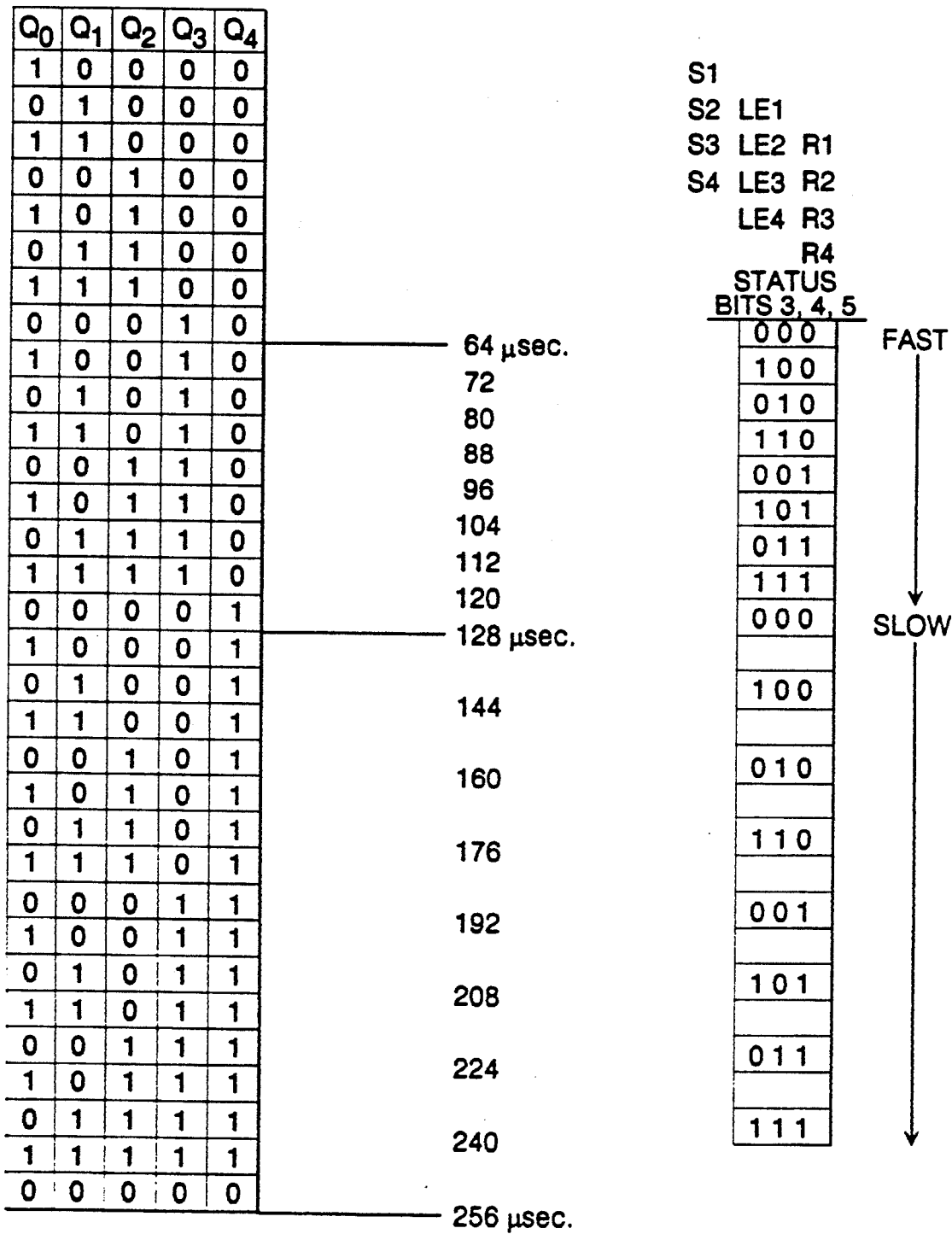
FIG. 15 is a state diagram illustrating the selection of the variable dwell times for the cycle sequencer illustrated in FIGS. 10A and 10B.

With attention directed to the present FIGS. 10A and 10B and the timing diagram of FIG. 15, the timing signals T1-T6 from AND gates 484-494 are the first six decoded counts of the 32-state counter 496. The counter 496 has a reset circuit 502 which allows it to count to one of its states, and then resets the counter to a predetermined state by providing a pulse to the preload terminal *PL. The initial count state of counter 496 is 10000 and causes AND gate 484 to output a high level logic signal TI during that count. The 10000 state decoded by the AND gate 484 arms the RS bistable 498 for opening the switch of a VCO corresponding to switch signal SW1. When the pulse from bistable 497 occurs, about half way through state 10000, the RS bistable 498 is set thereby opening the corresponding switch with signal SW1 and blanking the VCO. The next state (T2) 01000 is decoded by AND gate 486 and generates the read RAM clock signal RDCLK from NOR gate 520 to read the RAM location addressed. Simultaneously, the LE1 signal is generated by the NAND gate 476 from the signal T2 if authorized. These signals cause the addressed RAM location to be read and the corresponding latch to be loaded with the address contents during the open switch time. The next state (T3) 11000, decoded by AND gate 488, arms the reset of the RS bistable 498 and the pulse generated by bistable 499 during this state resets the bistable and closes the switch.

Figure 11:
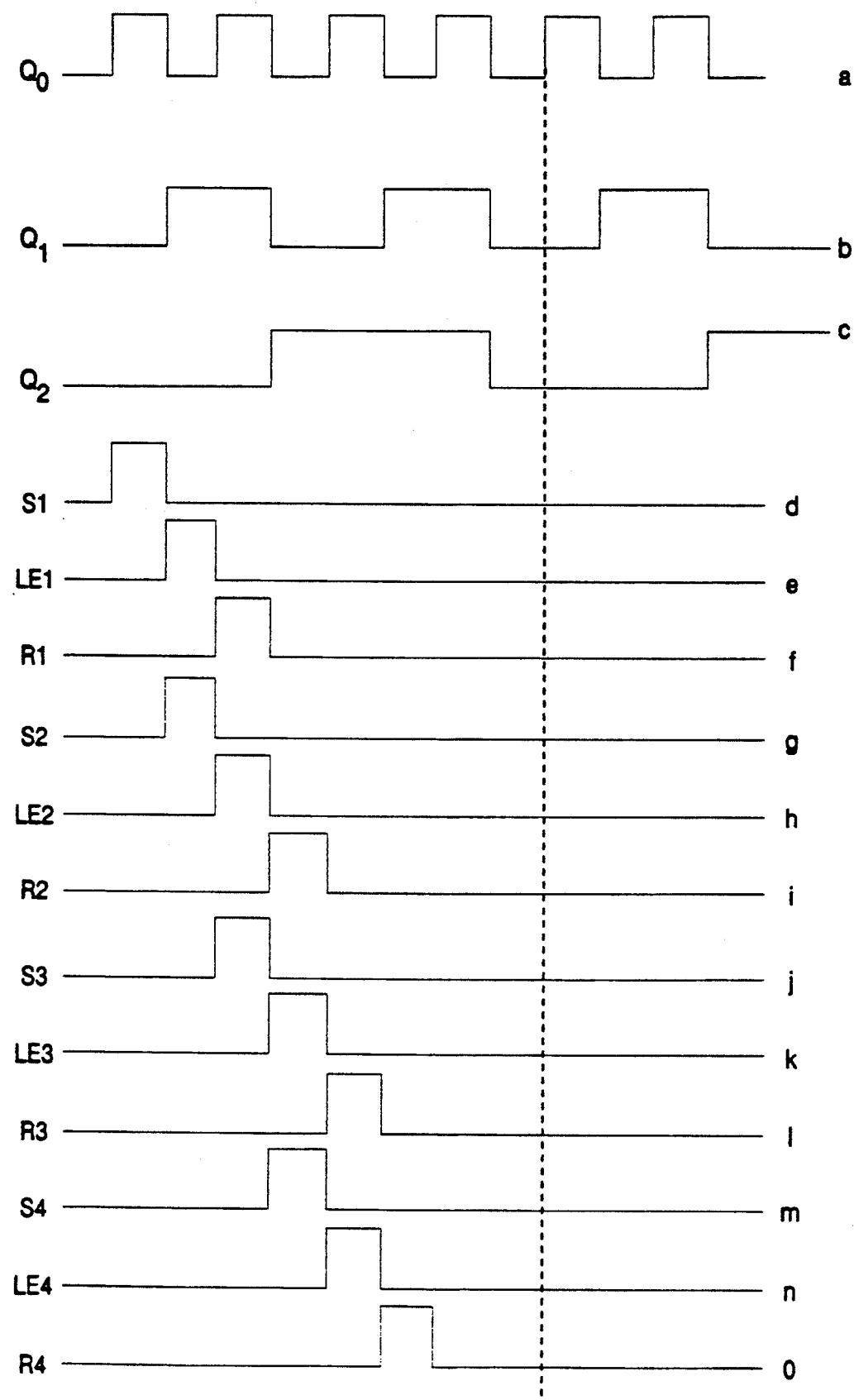
FIGS. 11-14 are pictorial representations of electrical waveforms for various portions of the cycle sequencer illustrated in FIGS. 10A and 10B.

Similarly, AND gates 486, 488, and 490 decoding states 01000, 11000, and 00100 cause the sequence of the setting of RS bistable 500, the generation of the RDCLK signal and LE2 signal, and the resetting of the RS bistable 500. The AND gates 488, 490 and 492 decode states 11000, 00100, and 10100 to provide signals for setting the RS bistable 502, and the generation of the RDCLK signal and the LE3 signal, and the resetting of the RS bistable 502. Finally, AND gates 490, 492, and 494 decode states 00100, 10100, and 01100 to set bistable 504, to provide the RDCLK signal and the LE4 signal, and to reset bistable 504. The timed outputs for the sequencing of the RS bistables 498-504 with the timing signals T1-T6 is illustrated in FIGS. 11a-11o.

Figure 12:
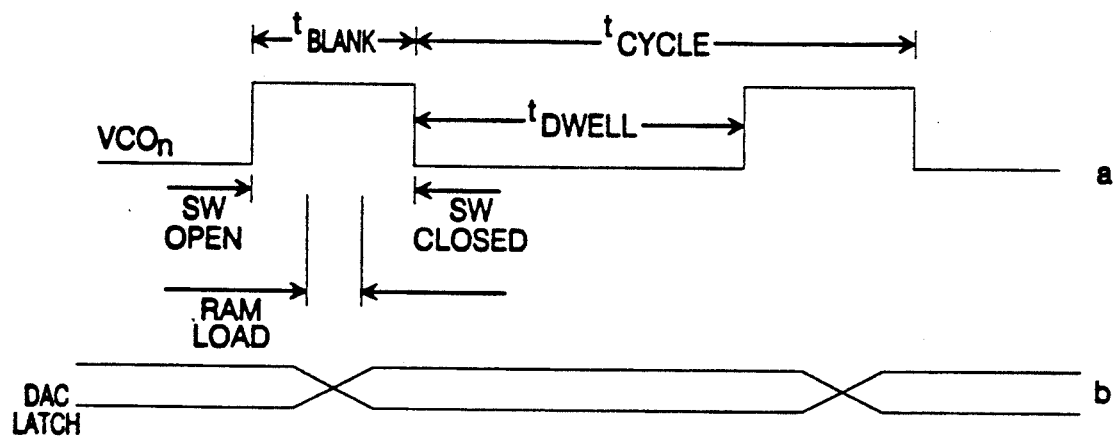
Figure 13:
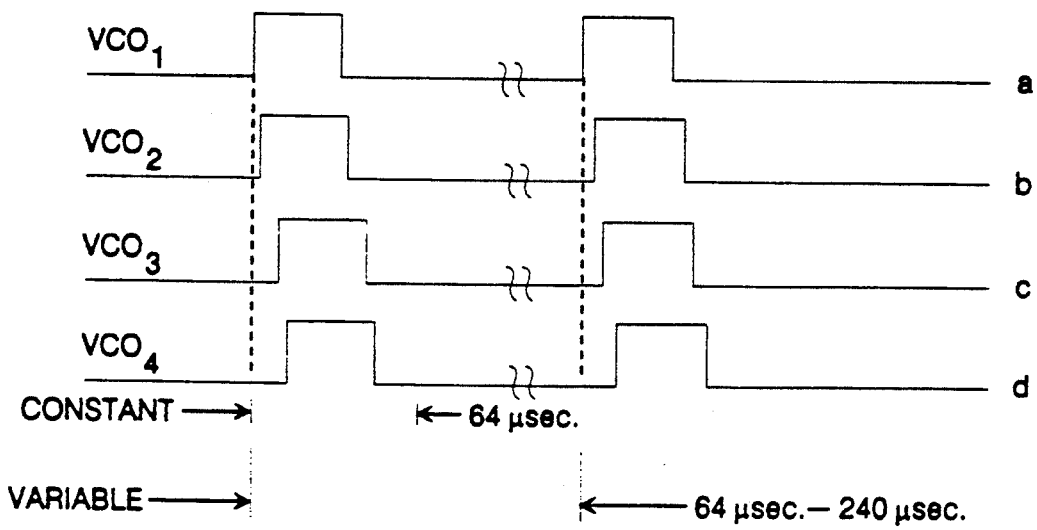

The blanking cycle for each of the four frequency generator combinations is performed in the first six counts of the counter 496 has three portions, the first relating to opening the switch to blank the VCO, the second relating to loading the latch, and the third relating to closing the switch to unblank the VCO. FIG. 12 discloses this cycle where the hopping or jamming cycle includes a blanking period as described which causes the frequency hop of the VCO and a dwell portion during which the generated jamming frequency interdicts a premium channel. It is advantageous to make the blanking time as short as possible to supply maximum jamming energy to the channel. FIG. 13 discloses the timed relationship of the jamming cycle for all four frequency generators. It should be noted that each blanking cycle is constant (3 counts) and all blanking cycles occur in the first six counts.

Figure 14:
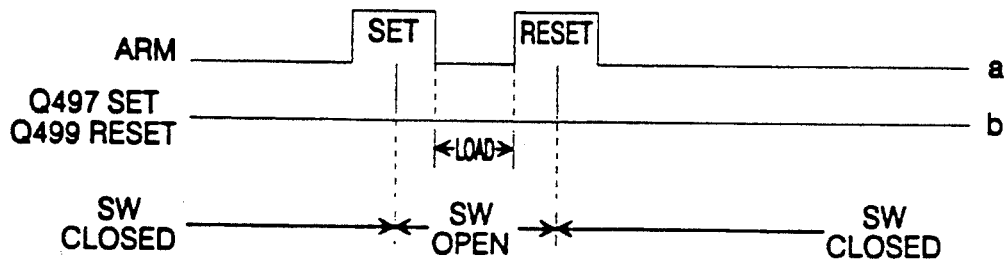

As illustrated in FIG. 14, the pulses from bistable 497, 499 which set and reset the RS bistables 498-504 are variable in increments of ⅛ of a state count. For the preferred embodiment, with a counter 496 having nominal count of 8μ secs., this produces a variability in 1μ sec. increments and a blanking time of between 10μ secs. (set on the last increment before load and reset on the first increment after load) and 24μ sec. (set on the first increment before load and reset on the last increment after load.) This variability is used in case the clock is not exactly 8μ secs., the switches need more time to dissipate the jamming energy, or the RAM and DAC need more than the 8μ sec. to be read, loaded, and settled. The design thus allows a wide variation in element tolerances without losing any effectiveness.

After each of the four VCOs is loaded with a frequency control word, the counter 496 continues to count until a predetermined dwell time has expired. In the preferred implementation, the jamming cycle duration or hopping rate is addressably programmable. The programmability is provided by decoding the different states of the counter 496 and resetting it to its first count 10000 based upon a combination of jamming cycle duration bits loaded into the sequence register SEQ and the status register ST2. These bits are logically combined with the state counts of the counter in the reset circuit 502 to provide the preload or reset signal after a selected jamming cycle duration has expired. The reset circuit 502 comprises XOR gates 534-538 and 540-544, AND gates 530, 532, and NOR gate 528. One set of XOR gates 540-544 and NAND gate 530 combine Bits 3,4, and 5 of the sequence bus with counter outputs Qϕ, Q1, Q2, and Q3, while another set of XOR gates 534-538 and gate 532 combine Bits 3, 4, and 5 of the sequence bus with counter outputs Q1, Q2, Q3, and Q4.

The AND gate 530 further has an input from bit 5 of the status bus ST2, which is the SLOW/FAST bit. The AND gate 530 has the inversion of this signal applied to one of its inputs via inverter 524. Basically, as is better illustrated in FIG. 15, AND gate 530 decodes the Q3 output of the counter 496 when the Bits 3, 4, and 5 are 000 and resets the counter via the NOR gate 502. In this basic operation, the AND gate 530 is enabled by a high logic level from the Bit 5 of the status bus ST2 indicating a fast hopping rate. Because the nominal count signal 8μ secs. and Q3 output of counter 496 represents a binary count of 8, the jamming cycle time for each VCO will be 64μ seconds in this operational configuration. The decoded count for resetting the counter 496 is changed by varying the states of the Bits 3, 4, and 5 which are applied to the inputs of the XOR gates, respectively. When enabled by a high logic level from a bit an XOR gate will pass the Q output of the corresponding counter stage to the AND gate and cause a reset signal.

Because each count state is 8μ secs. long, the fastest jamming cycle time will be 64μ secs. for a counter state of binary 8 with Bits 3, 4, and 5 having a 000 state, 72μ secs. for a counter state of binary 9 having Bits 3, 4, and 5 with states of 100, 80μ secs. for a counter state of binary 10 having Bits 3, 4, and 5 with states of 010 . . . and a dwell time of 120μ secs. with a counter state of binary 15 with Bits 3, 4, and 5 having states of 111.

The FAST/SLOW Bit 5 from status bus ST2 disables AND gate 530 and enables AND gate 532 to provide a similar function with counter outputs Q1, Q2, Q3, and Q4 and have the effect of doubling the jamming cycle times of the previous example. Therefore, instead of counting a single 8μ sec. count before resetting, the counter will count 2 states, or 16μ secs. for each additional state. Additionally, the counter 496 begins the reset operation in this mode at a count of binary 16 or 128μ secs. with Bits, 3, 4, and 5 having states of 000 because Q4 is decoded by AND gate 532. The counter 496 will thereafter reset on a count of binary 18 or 144μ secs. for Bits 3, 4, and 5 having states of 001; 160μ secs. or a count state of binary 20 for Bits 3, 4, and 5 having states of 100; and a count state of binary 22 or 176μ secs. when Bits 3, 4, and 5 have states of 110 . . . and a count of binary 30 indicating 240μ secs. when Bits, 3, 4, and 5 have states of 111.

With this sequencing operation, each of the memory, latch, DAC, and VCO jamming frequency generations has a means to selectively change the jamming frequency once every jamming cycle and can be addressably programmable over a large hopping range from 64μ secs. to 240μ secs. It is noted that the blanking operation, by being accomplished at the beginning of each jamming cycle and within the fastest reset time, remain constant. The variability of the hopping rate can be accomplished by extending the cycle without further coaction between the blanking and dwell period. This allows the blanking cycle to remain substantially constant and a small portion of the overall cycle which allows the system to apply maximum jamming energy to the CATV signal.

Figure 16:
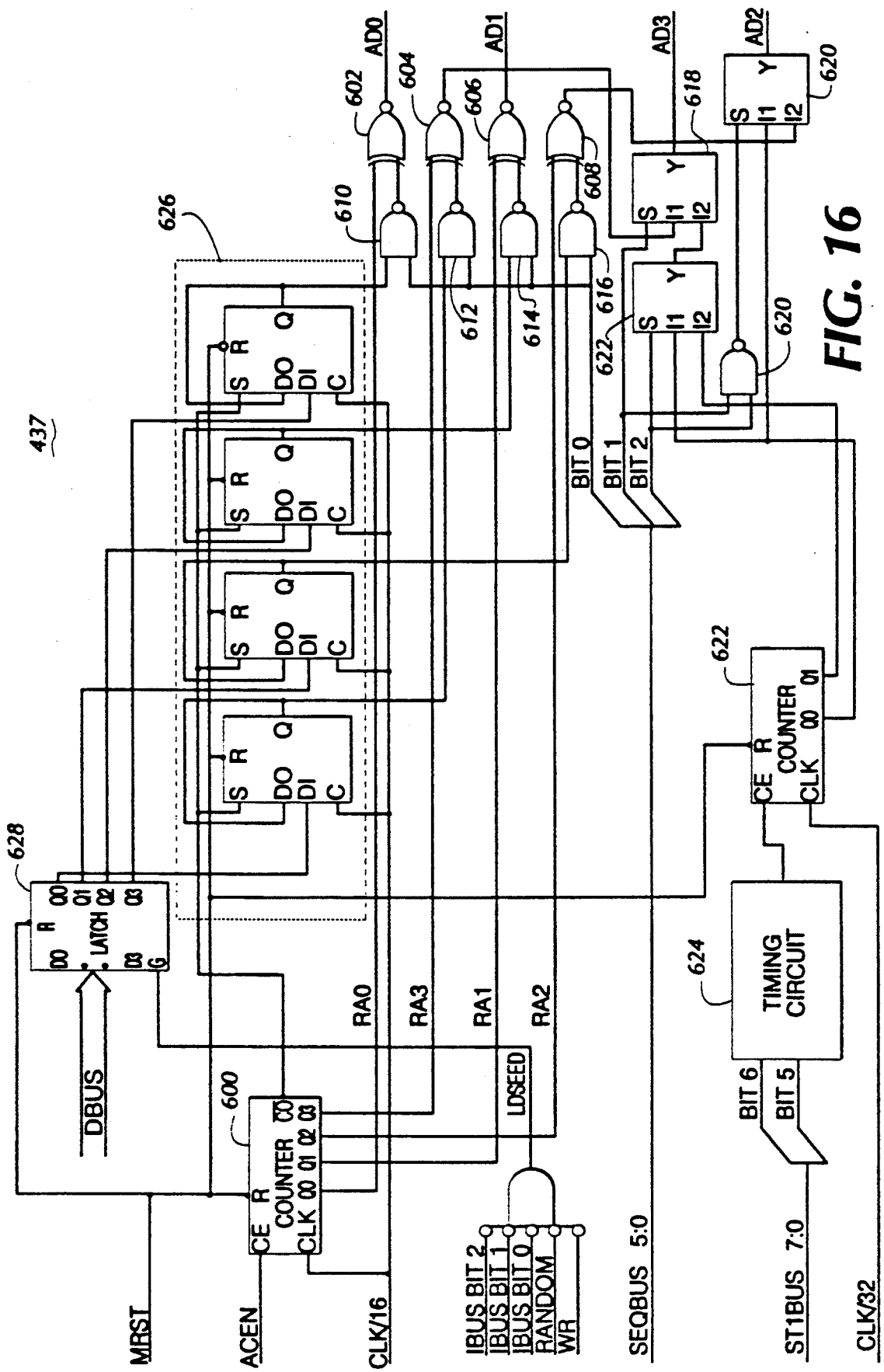
FIG. 16 is a detailed electrical schematic of the address generator illustrated in FIG. 5B.

The generation of the lower order 4 bits of the RAM address RD0-RD3 will now be more fully explained with reference to FIG. 16 where the address generator 434 of the jamming state machine 402 is illustrated. The address generator 434 determines the timing and the sequence in which the frequency control words are read out of the 16 time slots of each memory block. The address generator 434 is adapted to read the frequency control words out of the memory 404 in a fixed sequence which is termed the continuous mode or in a pseudo-random sequence which is termed random mode. Further provision has been made for a pulsed mode where a subgroup of the 16 frequency control words are repeated for a predetermined duration and then another subgroup is repeated for that duration before sequencing through the remaining subgroups.

In the preferred embodiment there are two implementations of pulsed mode jamming, one where half of the frequency control words (8) are selected (termed half mode) for a repeat cycle of time before the other half are selected for the repeat cycle, and a second implementation where each subgroup of addresses if four frequency control words (termed quarter mode). However, it will be evident from the following description that any number of frequency control words can be selected for a subgroup of the 16 frequency control words for pulsed mode and these two modes are to be viewed as exemplary rather than limiting to the invention.

In the continuous mode a 4-bit synchronous counter 600 generates 1 of 16 counts synchronously with the clock pulses from clock signal CLK/16 delivered to its clock input CLK. These counts RA0-RA3 are a sequence through the 16 addresses in the predetermined order of the count sequence of the counter 600, though not necessarily in numerical or binary sequence. The counter 600 increments once every time the cycle sequencer 432 resets because of the address count enable signal ACEN applied to its CE input. The address counts RA0-RA3 are respectively input to one terminal of XOR gates 602-608. The other inputs of the XOR gates are from a plurality of NAND gates 610-616 which are disabled in the continuous mode by a low logic level signal on their inputs from Bit 0 of the sequence bus SEQ. Bit 0 of the sequence bus is the RANDOM bit which indicates whether the random mode is on or off. The address counts RA0-RA3 are thus unchanged when output from the XOR gates in the continuous mode.

RA2 and RA3 are input to two 2:1 multiplexers 618, 620 where they are selected by signals which applied to the select inputs S0 of the devices for choosing an output. The select signals comprise Bit 1 and Bit 2 of the sequence bus indicating whether continuous mode is ON/OFF and whether pulsed mode is HALF/QUARTER mode, respectively. When the continuous mode (Bit 1) is a high logic level, I1 of the multiplexer 618 is chosen for output and I2, via NAND gate, 620, of multiplexer 620 is chosen for output. A continuous address sequence is shown in FIG. 20 for all four blocks of RAM 404. In the first jamming cycle, address 0 of blocks 1, 2, 3, 4 are addressed in order. The next cycle causes address 1 of blocks 1, 2, 3, 4 to be addressed in order. Successive cycles then cause addresses 2, 3, 4, . . . 15 to be read out for all blocks before the system repeats address 0 again. This sequence assumes counter 600 counts in numerical binary sequence which is the preferred embodiment.

A pseudo-randomization of the address counts is provided by enabling NAND gates 610-616 so that a seed count (4-bit digital number) is XORed with the address counts RA0-RA3 in the XOR gates 602-608. If the seed count is randomly generated and changed in a random manner, then the address sequence of the RAM 404 will vary in a random manner. The address sequence is pseudo-random because, for the implementation illustrated, the XORing of a 4-bit seed count with a fixed address count will produce 16 different predetermined patterns which will depend on the seed count. The NAND gates 610-616 are enabled by Bit 0 of the sequence bus which indicates the ON/OFF states for the random mode of operation. Bit 1 of the sequence bus is set high for the continuous mode of operation during this function.

The seed count is output from a recirculating seed generator 626 having four stages of memory comprising dual input D-type bistables. Each bistable has its Q output coupled back to one of its inputs, D1. The seed generator 626 recirculates the seed count from the D1 inputs to their respective Q outputs synchronously with the clock signal CLK/16 applied to its clock inputs CLK. The seed generator 626 can be loaded from a 4 bit seed register 628 which has its Q outputs connected to the second inputs D1 of the seed generator. When the counter 600 overflows and reinitiates its count sequence, it will generate a load seed count signal LSC from its overflow output $\overline{CO}$ to the select inputs S0 of the seed generator 626. This signal applied to the select inputs S0 of the seed generator 626 loads it with the seed count stored in the seed register 628.

The seed register 628 is updated by the load register instruction from the control microprocessor 212 to load a new seed count. The load seed register instruction is decoded by NAND gate detecting a coincidence of the control signal WRITE WR, Bits 0, 1 and 2 of the load seed register instruction, and the control signal RANDOM from the master state machine 400. This signal is input to the G input of the seed register 628 causing the register to store the data values on the DBUS 424. The D0-D3 inputs of the seed register 628 are connected to the data bus lines 0-3 and thereby load the seed count input from the control processor 212.

The seed count can be generated in at least two ways. In a first process, the seed count may be downloaded from the headend , ether as an addressable communication or a global communication. Alternatively and preferably, the control processor 212 has a free running counter which is reads on a random basis (when it cycles through a background program list). This randomly generated count can then be loaded into the random seed register with the WRITE SEED REGISTER instruction.

FIG. 21 illustrates the combination of a seed count (0110) with the fixed address sequence of the counter 600 to generate a pseudo-random jamming pattern. Each of the 16 separate possible seed counts will generate a different pseudo-random jamming sequence. This operation makes the unauthorized viewing of the premium channel much more difficult to accomplish.

Figures 17, 18:
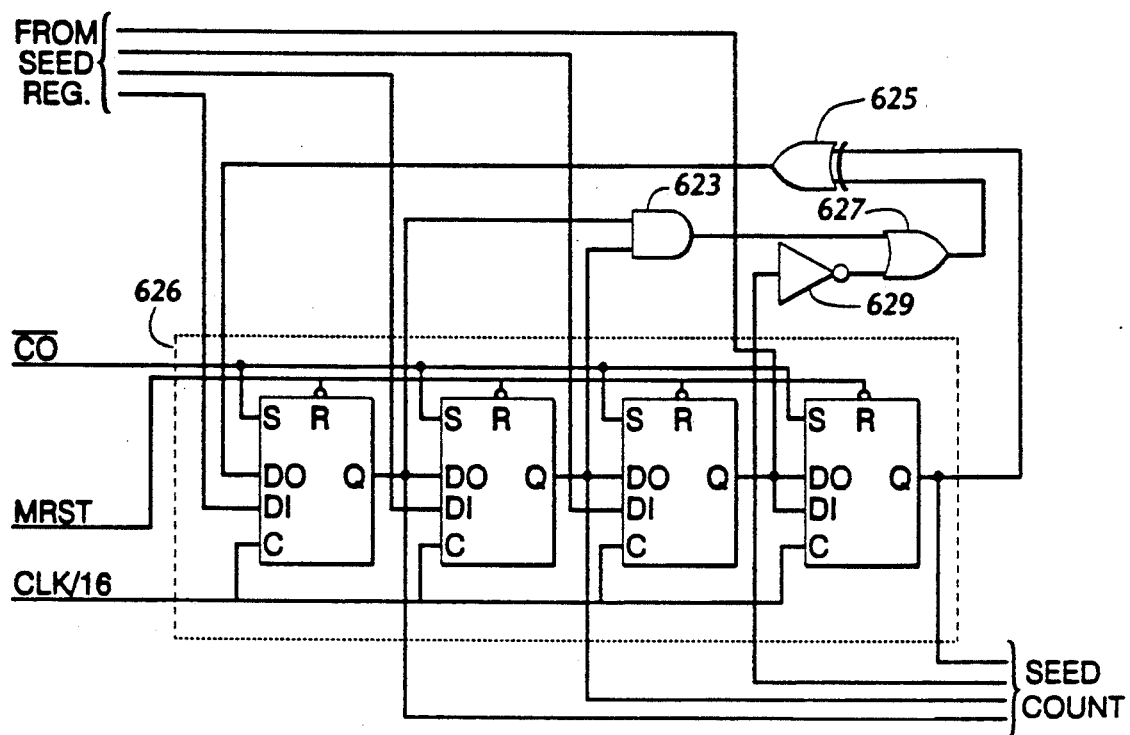
FIG. 17 is a detailed electrical schematic of a second embodiment of the seed generator for the address generator illustrated in FIG. 16.
FIG. 18 is a tabular representation of the seed count from the seed generator illustrated in FIG. 17.

FIG. 17 illustrates a second embodiment of the seed generator 626. The AND gate 623, XOR gate 625 and OR gate 629 decode different states of the seed generator and cause it to count in the sequence illustrated in FIG. 18. This count sequence will evenly distribute jamming energy from a skipped frequency control word over the other active time slots.

The pulsed mode operation of the address generator 434 is provided by a pulse mode circuit which includes the multiplexers 618, 620 and 622, an address counter 622, and timing circuitry 624. As previously described, when the address generator 434 is in the continuous mode (either generating a predetermined sequence or a random sequence), the I1 input of multiplexer 618 and the I2 input of multiplexer 620 are chosen to output the address AD2, AD3. This produces an address generation via XOR gates 602-608 and the counter 600.

The three multiplexers 618, 620, and 622 work in the HALF/QUARTER mode to cause RAM addresses AD2 and AD3 to be generated from the counter 622. When the continuous mode bit is at a low logic level, input I2 of multiplexer 618 is chosen for output and RAM address AD3 via XOR gate 604 is essentially disabled. Similarly, when the continuous bit is a low logic level, the I1 input of multiplexer 620 is selected for output which essentially disables the output of AD2 via XOR gate 608. The input I2 of multiplexer 618 is from the output of multiplexer 622 which has a selection of inputs from the Q0 and Q1 outputs of the counter 622. The input I1 of multiplexer 620 is the Q0 output of the counter 622.

The HALF/QUARTER mode Bit 2 is applied to the select input S0 of multiplexer 622 and used to select between the two signals Q0, Q1. In HALF mode, when the Bit 2 is a high logic level, input I1 of multiplexer 620 is enabled and I1 of multiplexer 622 is enabled. This causes addresses AD2 and AD3 to change with the changes in the Q0, Q1 of the counter 622. RAM addresses AD0 and AD1 cycle in a normal manner from the outputs of XOR gates 602, 606. When the HALF/QUARTER mode Bit 2 is low, input I2 of multiplexer 622 is chosen and input I1 of multiplexer 620 is chosen. This selection causes an address subgroup of four of the sixteen words.

Figures 22, 23:
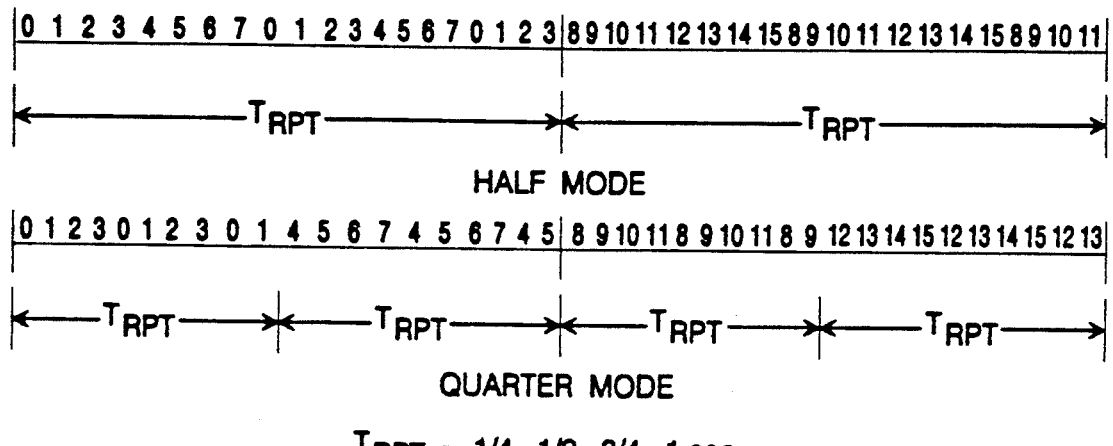
FIG. 22 are time representations of two examples of a pulsed mode sequence for the generation of addresses for the random access memory illustrated in FIG. 5B.
FIG. 23 is a tabular representation of specific effective combinations of various jamming parameters for the interdiction apparatus illustrated in FIG. 1.

The duration of the repeat cycling for these segments in the pulsed mode is chosen by the timing circuitry 624. The duration is chosen from a logical combination of the Bits 5 and 6 of the status bus ST1 and the clock signal CLK/32. The timing circuitry provides durations of 0.25, 0.5, 0.75, or 1.0 secs. which are used to enable the counter 622 to increment and change the subgroup address. FIG. 22 illustrates the timing of these two examples of pulsed mode jamming.

What occurs in pulsed mode jamming is a trade off between jamming factor and the time a channel is in the clear. For example, in half mode an unauthorized channel will be jammed twice as hard as in continuous mode but for only 50% of the time. The channel will be in the clear 50% of the time it takes to cycle through both subgroups. In quarter mode jamming the jamming factor is quadrupled but is applied only 25% of the time. The channel will be in the clear 75% of the time it takes to cycle through all four subgroups. The repeat duration is additionally selected to increase the effectiveness of this mode. If the repeat duration is too short then not enough jamming energy will be input to the channel and the effect will not be maximized. If the repeat duration is too long, the channel information may be comprehended because of the clear periods and much of the confusing effect of blinking the video on (clear) and off (jammed) could be lost. In general, it has been found that pulsed patterns from about 0.1 of a sec. to 10 secs. will produce a disruptive effect. From empirical studies, the most effective times of the pulsed jamming modes appear to be between 0.2 sec. and 1 sec. The number of subgroups depends upon the number of time slots which provide adequate jamming for the channel. In this manner, a programmable pulsed mode operation is provided which can be variable as to duration also. These variable jamming parameters can be combined and chosen to select the most effective jamming for a particular channel line-up for each subscriber. FIG. 23 illustrates a table of 8 particularly effective jamming parameter combinations. One combination uses 4 time slots per channel in continuous mode with a 64µ sec. dwell time. Using 4 out of 16 time slots for a particular channel will cause 25% of the jamming energy for the selected VCO to be directed to that channel and cause the entire video to be obliterated. Faster hopping rates, 64µ secs. to 80µ secs., are most effective for heavily jammed channels. This jamming combination is usually used on adult material channels.

For premium channels, such as movie channels, etc., where not all the video needs to be destroyed but still needs to be heavily jammed, 3 time slots with a fast hopping rate, 64µ secs. to 80µ secs. can be used.

To jam more channels with each oscillator, lighter jamming factors such as 1 and 2 time slots can be used. In general, such light jamming does not entirely destroy the video portion of the channel but produces enough picture degradation that the entertainment value is significantly lessened. In combination with a light jamming factor, a long jamming cycle duration 240µ secs. can be used to make the television receiver loose vertical hold and cause the picture to roll. In general, the long jamming cycle durations, above 128µ secs., are the most effective with light jamming.

In addition, for lightly jammed channels, the pulsed mode of operation can be used to increase jamming effectiveness by putting a flicker (on and off pulsing) of the jamming signal into the video portion of the channel. The pulsed mode can be half or quarter mode depending on the desired jamming effectiveness for a chosen subgroup. Normally, slower jamming cycle rates of 240µ secs. which are effective for lightly jammed channels are effective for pulsed mode operation. The most effective repeat duration for pulsed mode jamming, which is of course a subjective determination, has been found to be approximately 0.25 secs.

One particularly useful combination of parameters can be used on a channel line-up which can be termed tiered service. In this type of service, there are several basic tier channels which are paid for as a group and one or more premium channels which are paid for separately. The normal range of one oscillator is generally 13 channels, which could then jam 12 basic tier channels and 1 premium channel. Further, because there are 16 time slots in the system, each of the 12 basic tier channels can be lightly jammed with one time slot and the premium channel can be heavily jammed with four time slots. To further enhance the light jamming, quarter mode jamming can be used because the time slots for the heavily jammed channels can be distributed one to each subgroup and the pulsed jamming will not vary the jamming factor of that channel.

Figure 24:
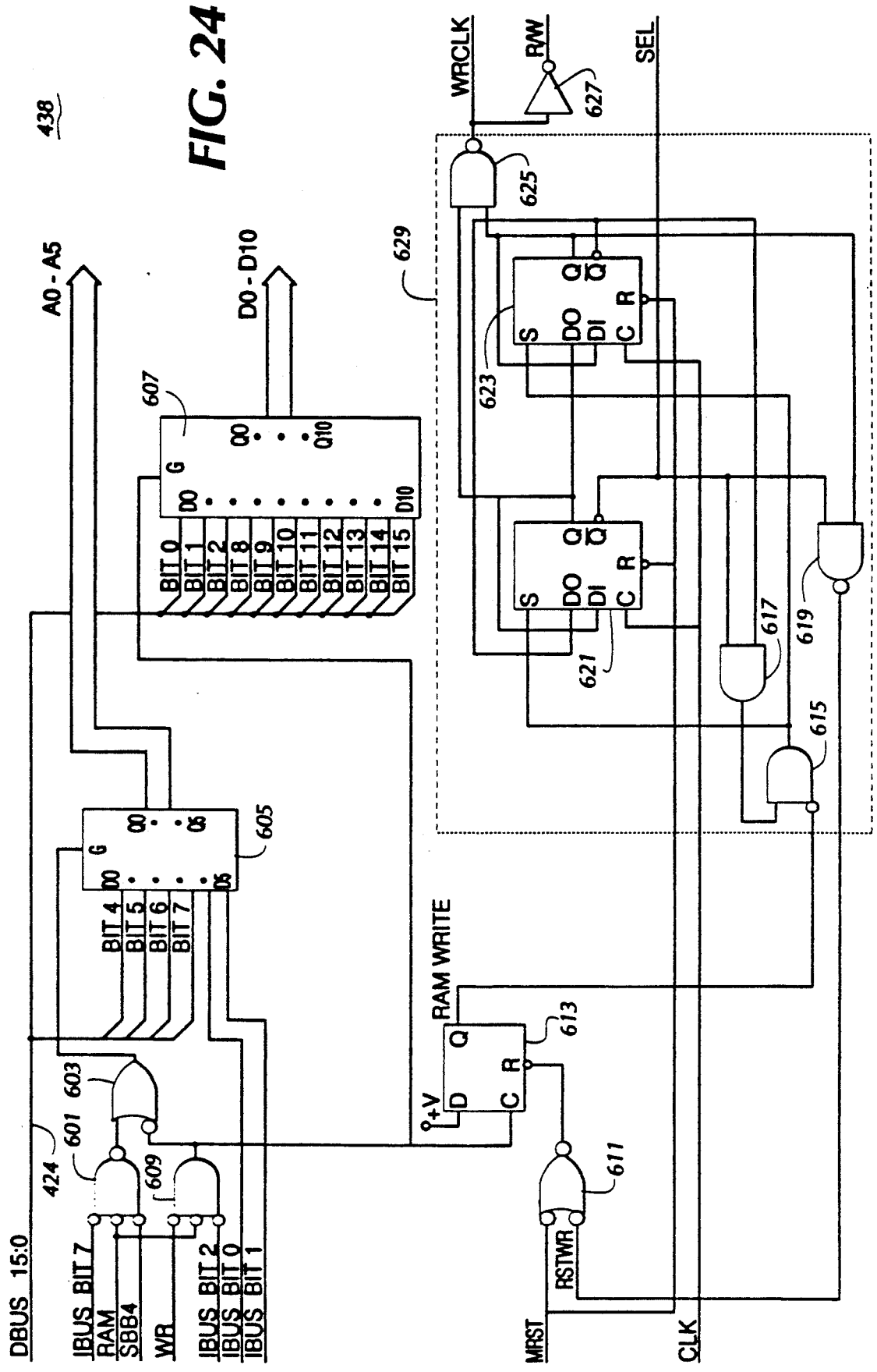
FIG. 24 is a detailed electrical schematic of the random access memory control illustrated in FIG. 5B.

The RAM control 438 will now be discussed with reference to FIG. 24 which illustrates a detailed electrical schematic of the circuit. The RAM control 438 functions to write new frequency control words into the RAM 404 in order to change the jamming pattern. Different channel patterns can be selected and jamming factors (number of time slots) can be chosen by the order of loading the RAM 404. The RAM control 438 comprises a 6 bit address latch 605 which stores the address where the new frequency control word is to be written and an 11-bit data latch 607 which stores the new frequency control word. The RAM control 438 includes decoding circuitry comprising NAND gate 601, AND gate 609 and OR gate 603 which decode the control signals RAM, SBB4, and WR from the master state machine 400 to load the latches 605 and 607 with the corresponding address and frequency control word upon instruction from the control processor 212. Once the registers 605, 607 are loaded, the RAM control 438 uses a write state machine 629 comprising D type bistable 613, 621, and 623, AND gates 615–619, and 625, OR gate 611 and inverter 627 to write the contents of the latches 605 and 607 to the addressed location of RAM 404.

With reference to the WRITE RAM instruction illustrated in FIG. 7. Initially, when the WRITE RAM instruction is decoded by the decoding circuitry 346 of the master state machine 400 the RAM signal and write signal WR are generated. Coincidentally, Bits 0,1 of the instruction on the IBUS are loaded into the address register 605 to determine the block address. After the second byte of the write RAM communication is ready, the data from bits 0, 1, 2 are loaded into the data register 607 at the same time as the Bits 4, 5, 6, and 7 are loaded into the address register 605. Subsequently, when the second byte of the data of the write RAM instruction is ready, the data register 607 is loaded with 8 bits from the DBUS 424. After loading the second byte of data, the output of AND gate 609 further clocks the bistable 613 to generate an enabling signal RAM write.

The signal RAM write enables the write state machine 629 to clock through a sequence which generates the write clock signal WRCLK from the output of NAND gate 625 and a READ/WRITE signal R/W from the output of inverter 627. Further, the select signal SEL is generated. The write clock signal WRCLK provides a clock signal to strobe the data from the data latch 607 into the memory location addressed.

The R/W signal halts the reading of the memory 404 by the jamming state machine 402 and allows the RAM control 438 to write a new frequency control word in the memory. The select signal SEL causes the address multiplexer to switch from the addresses generated by the jamming state machine 402 to the address of the address latch 605. The last state of the write state machine 629 causes a low logic signal from the output of NAND gate 619 which passes through NOR gate 611 to reset the bistable 613.

Figure 25:
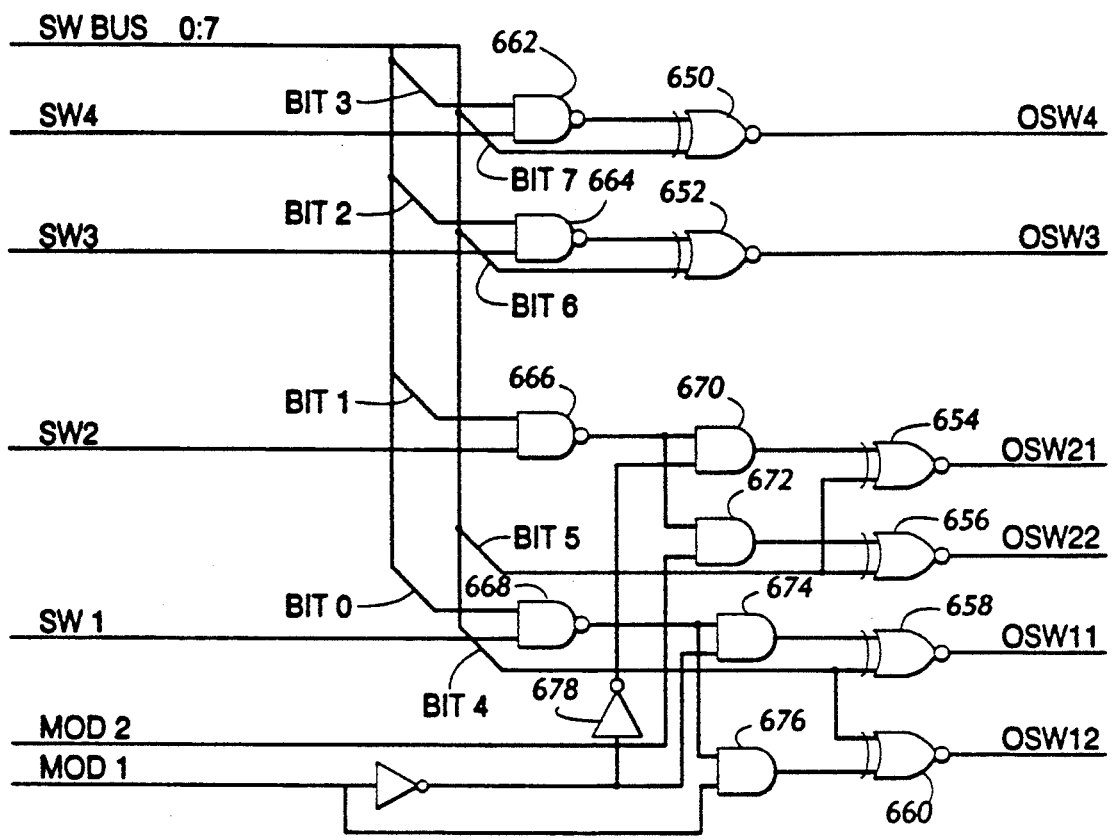
FIG. 25 is a detailed electrical schematic of the switch control illustrated in FIG. 5B.

The switch control, as more fully illustrated by reference to FIG. 25, is utilized to allow control of several types of VCOs with the switch signals SW1–SW4. In one mode, the switch control operates to pass the switch signals SW1–SW4 directly to the VCOs to operate the blanking switches contained therein. In a second mode, the switch outputs are controlled as to the polarity of their blanked state as determined by status information. In a variation of the first mode, one or more mode control bits are used to allow one switch signal to control one or more VCOs to extend the range of a particular channel group. As an alternative to the variation of the first mode, the mode control bits can be used directly to select the range of a VCO that has a multiple range capability.

The output switch signals OSW11, OSW12, OSW21, OSW22, OSW3, OSW4 are respectively the outputs of XOR gates 650–660. The input switch signals SW1–SW4, which are generated by the cycle sequencer 432, pass through enabled NAND gates 662–668 to become the output signals OSW11, OSW2, OSW3, OSW4 signals, respectively. The switch bus Bits B0–B7 of the switch register and the mode control signals MOD1, MOD2 are used to vary this mode. If the switch bus Bits B0–B3 are low, the NAND gates 662–668 are disabled and the input switch signals SW1–SW4 are not output from the gates. The switch outputs OSW-1–OSW4 are either set low or high depending upon which state will blank the particular VCO which it is controlling. This logical operation is accomplished by applying selected states of the switch bus register Bits B4–B7 to the other inputs of the XOR gates 650–660.

The mode bits, from the output of the mode register selectively switch the outputs of the NAND gates 670–676 from the input of one XOR gate to the other. The MOD1 signal via AND gates 674, 676 and inverter 680 selects the input of XOR gate 658, if low, and selects the input of XOR gate 660, if high, for NAND gate 668. The signal MOD2 via AND gates and inverter select the input of XOR gate, if low, or the input of XOR gate, if high for NAND gate. In this manner, output OSW11 or OSW12 can be chosen for the switch signal SW1.

The switch control in combination with the status register ST2, the switch register SW, and the mode control register provide a unique flexibility in controlling the operation of the VCOs. The interdiction apparatus is adapted to control two basic types of VCO, a switched type as shown in FIGS. 20, 22, and 23 and a keyed type as shown in FIG. 21. The switched type uses one of the switching signals SW1–SW4 with a separate switch to blank the oscillator while the DAC latch is being loaded. The keyed type switches the power pin on and off to blank the oscillator.

Of the switched type of VCO, there is the capability of controlling a single range device as shown in FIG. 20. With the switch control and the mode bits from the mode register, multiple VCOs can be controlled as shown in FIG. 23. The mode control bits are thereby used to gate the blanking signals to more than one VCO. For this embodiment, two separate VCOs, each having a different frequency range, can be controlled by selecting one VCO which generates the jamming frequency and blanking the other. The mode control bit(s) thereby become an address for a particular VCO which can be associated with one of the frequency control words. This effectively permits the choice of a frequency range with the mode control bits. In the implementation of a multiple frequency range VCO shown in FIG. 22, the mode control bit(s) can be used directly to select the frequency range of a the device.

Figure 30:
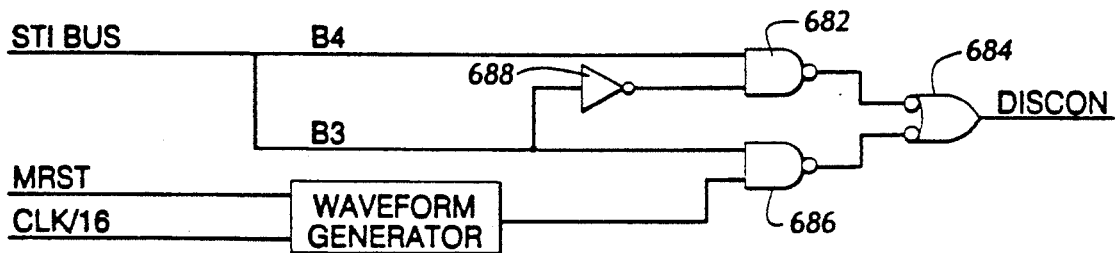
FIG. 30 is a detailed electrical schematic of the disconnect control illustrated in FIG. 5A.

The preferred implementation of the disconnect circuit 440 as controlled by the master state machine 400 is shown in FIG. 30. The disconnect circuit 440 comprises control logic to select between a static disconnect operation (disconnect switch always open in the disconnect state) and a dynamic disconnect operation (disconnect switch cycled open and closed during a disconnect state). The status register ST1 1 Bits 3 and 4 are used to select the particular operation. Bit 4 indicates whether the subscriber module is to be disconnected (high) or connected (low), and Bit 3 indicates whether the disconnect state should be static (low) or dynamic (high).

Figure 31:
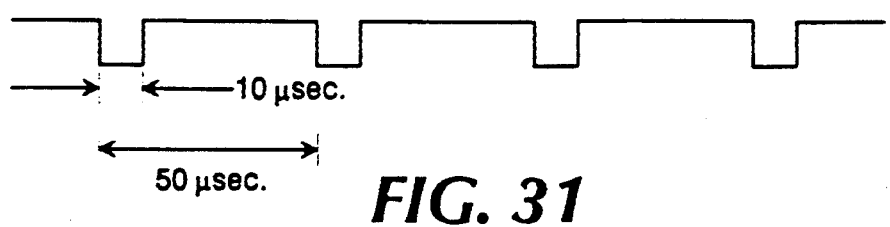
FIG. 31 is a pictorial representation of the electrical waveform of a typical dynamic disconnect signal from the disconnect control illustrated in FIG. 30.

If the subscriber module 134 should be disconnected in the static mode, Bit 4 is high and the output of inverter 688 is high because of the low input of Bit 3. These signals produce a low signal from NAND gate 682 which passes through the negative true input of OR gate 684 to become the disconnect signal, DISCON. Alternatively, if Bit 3 is low, then NAND gate 682 is disabled and NAND gate 686 is enabled. The other input to NAND gate 686 is from the waveform generator 694 which produces a periodic oscillation based on the clock signal CLK/16. The waveform generator preferably generates an asymmetric signal which has a duty cycle for the disconnect switch of approximately 80% open and 20% closed. This operation produces broad spectrum noise and defeats unauthorized use of the CATV signal due to ineffective isolation of the in the clear signal in some systems. Preferably, the oscillation should be faster than approximately 16 kHz and slower than 32 kHz (its second harmonic) to avoid synching with the most common refresh rate of televisions, the horizontal blanking frequency. Because the signal CLK/16 is set within predetermined limits of the dynamic disconnect rate is nominally about 20 kHz. A preferred representation of the waveform is illustrated in FIG. 31.

While there has been shown and described the preferred embodiments of the inventions, it will be evident to those skilled in the art that various modifications may be made thereto without departing from the spirit and scope of the invention as set forth in the appended claims.

What is claimed is:

1. An interdiction apparatus for selectively interdicting unauthorized channel signals in a broadband CATV signal with jamming signals, the interdiction apparatus located off premises from a subscriber location and receiving the broadband CATV signal from a headend over a distribution network, said apparatus comprising:
   common circuitry including means for compensating and for distributing the broadband CATV signal to one or more subscriber modules, and control processor means for communicating with the headend over the distribution network and adapted to receive addressable instructions and data;

said one or more subscriber modules including master processor means for communicating with said control processor means and adapted to receive instructions and data from said control processor means;

means for storing frequency control words, each of said frequency control words representing a particular jamming frequency and including at least one mode control bit;

a plurality of jamming frequency generators for receiving said frequency control words and for generating a plurality of jamming frequencies representative of said frequency control words;

jamming processor means for controlling said storing means to selectively output said stored frequency control words in a predetermined sequence and for controlling said jamming frequency generators to generate the plurality of jamming frequencies representative of said predetermined sequence, and for generating mode control signals from said at least one mode control bit;

switch control means for selecting one of said plurality of jamming frequency generators in response to said mode control signals; and means for combining said jamming frequencies with the broadband CATV signal to interdict the unauthorized channels.

2. An interdiction apparatus for selectively interdicting unauthorized channel signals in a broadband CATV signal with jamming signals, said apparatus comprising:

means for storing frequency control words, each of said frequency control words representing a particular jamming frequency and including at least one mode control bit;

means for controlling said storing means to selectively output said stored frequency control words in a predetermined sequence;

a plurality of jamming frequency generators for receiving said sequence of frequency control words, generating a plurality of jamming frequencies representative of said predetermined sequence, and modifying said plurality of jamming frequencies based on control signals generated from said mode control bits;

switch control means for controlling the application of blanking signals to a plurality of voltage controlled oscillators, said switch control means, responsive to said mode control signals, for selecting one of said plurality of voltage controlled oscillators to which said blanking signal is applied; and means for combining said jamming signals with said broadband CATV signal to interdict the unauthorized channels.

3. An interdiction apparatus as set forth in claim 2 wherein said jamming frequency generators include said plurality of voltage controlled oscillators, each of which having multiple frequency ranges, each mode control signal for selecting one of the ranges of an associated voltage controlled oscillator.

4. An interdiction apparatus for selectively interdicting unauthorized channel signals in a broadband CATV signal with jamming signals, the interdiction apparatus located off premises from a subscriber location and receiving the broadband CATV signal from a headend over a distribution network, said apparatus comprising:

common circuitry including means for compensating and for distributing the broadband CATV signal to one or more subscriber modules, and control processor means for communicating with the headend over the distribution network and adapted to receive addressable instructions and data;

said one or more subscriber modules including master processor means for communicating with said control processor means and adapted to receive instructions and data from said control processor means;

means for storing frequency control words, each of said frequency control words representing a particular jamming frequency and including at least one mode control bit;

a plurality of jamming frequency generators for receiving said frequency control words and for generating a plurality of jamming frequencies representative of said frequency control words;

jamming processor means for controlling said storing means to selectively output said stored frequency control words in a predetermined sequence and for controlling said jamming frequency generators to generate the plurality of jamming frequencies representative of said predetermined sequence, and for generating mode control signals from said at least one mode control bit;

switch control means for controlling the application of blanking signals to the plurality of jamming frequency generators, said switch control means, responsive to said mode control signals, for selecting one of the jamming frequency generators to which said blanking signal is applied; and means for combining said jamming frequencies with the broadband CATV signal to interdict the unauthorized channels.

5. An interdiction method for selectively interdicting unauthorized channel signals in a broadband CATV signal with jamming signals, said method comprising the steps of:

storing a plurality of frequency control words representative of particular jamming frequencies and mode control signals into first memory locations;

generating a plurality of jamming signals with frequencies based upon segments of frequency control words which are stored in second memory locations;

generating a plurality of mode control signals based upon segments of frequency control words stored in third memory locations;

transferring segments of said frequency control words stored in said first memory locations to said second and third memory locations in a sequence to change the frequencies and blanking modes;

selecting one of a plurality of voltage controlled oscillators to be applied blanking signals according to the blanking mode; and combining said jamming signals with the broadband CATV signal to interdict the unauthorized channels.

6. An interdiction apparatus for selectively interdicting unauthorized channel signals in a broadband CATV signal with jamming signals, said apparatus comprising:

means for storing frequency control words, each of said frequency control words representing a particular jamming frequency and including at least one mode control bit;

means for controlling said storing means to selectively output said stored frequency control words in a predetermined sequence;
a plurality of jamming frequency generators for receiving said predetermined sequence of frequency control words and generating a plurality of jamming frequencies representative of said predetermined sequence;
means for selecting one of a plurality of jamming frequencies generators based on control signals generated from said mode control bits;
means for combining said jamming frequencies with the broadband CATV signals to interdict unauthorized channels.

7. An interdiction apparatus as set forth in claim 6 wherein:
said jamming frequency generators store said mode control bits in a mode control register which generates mode control signals according to the states of the mode control bits, each mode control signal being associated with its corresponding frequency control word.

8. An interdiction apparatus as set forth in claim 6 wherein:
said jamming frequency generators include a plurality of voltage controlled oscillators, each of which have a different frequency range; and
each mode control signal is used to select one of said plurality of voltage controlled oscillators.

9. An interdiction apparatus for selectively interdicting unauthorized channel signals in a broadband CATV signal with jamming signals, said apparatus comprising:
means for storing frequency control words, each of said frequency control words representing a particular jamming frequency and including at least one mode control bit;
means for controlling said storing means to selectively output said stored frequency control words in a predetermined sequence;
a plurality of jamming frequency generators for receiving said predetermined sequence of frequency control words and generating a plurality of jamming frequencies representative of said predetermined sequence, at least one of said jamming frequency generators being capable of producing more than one range of jamming frequencies;
means for selecting one of said ranges of jamming frequencies in a selected one said one or more jamming frequency generators capable of producing more than one range of jamming frequencies based on control signals generated from said mode control bits;
means for combining said jamming frequencies with the broadband CATV signals to interdict unauthorized channels.

10. An interdiction apparatus as set forth in claim 9 wherein:
said jamming frequency generators store said mode control bits in a mode control register which generates mode control signals according to the states of the mode control bits, each mode control signal being associated with its corresponding frequency control word.

11. An interdiction apparatus as set forth in claim 9 wherein said jamming frequency generators comprise voltage controlled oscillators.

12. An interdiction method for selectively interdicting unauthorized channel signals in a broadband CATV signal with jamming signals, said method comprising the steps of:
storing a plurality of frequency control words representative of particular jamming frequencies and mode control signals into first memory locations;
transferring segments of said frequency control words stored in said first memory locations and representing particular jamming frequencies to second memory locations in a sequence;
transferring segments of said frequency control words stored in said first memory locations and representing mode control signals to third memory locations in a sequence;
generating a plurality of mode control signals in sequence based on segments of frequency control words stored in said third memory locations;
selecting among a plurality of jamming frequency generators based on said mode control signals; and
generating a plurality of jamming signals in sequence with frequencies based upon segments of frequency control words stored in said third memory locations and the selection among jamming frequency generators by selecting step; and
combining said jamming signals with the broadband CATV signal to interdict the unauthorized channels.

13. An interdiction method for selectively interdicting unauthorized channel signals in a broadband CATV signal with jamming signals, said method comprising the steps of:
storing a plurality of frequency control words representative of particular jamming frequencies and mode control signals into first memory locations;
transferring segments of said frequency control words stored in said first memory locations and representing particular jamming frequencies to second memory locations in a sequence;
transferring segments of said frequency control words stored in said first memory locations and representing mode control signals to third memory locations in a sequence;
generating a plurality of mode control signals in sequence based on segments of frequency control words stored in said third memory locations;
selecting among a plurality of jamming frequency ranges in at least one of a plurality of jamming frequency generators capable of operating in multiple frequency ranges based on said mode control signals; and
generating a plurality of jamming signals in sequence with frequencies based upon segments of frequency control words stored in said third memory locations and the selection among jamming frequency ranges by selecting step; and
combining said jamming signals with the broadband CATV signal to interdict the unauthorized channels.

14. An interdiction apparatus for selectively interdicting unauthorized channel signals in a broadband CATV signal jamming signal, the interdiction apparatus located off premises from a subscriber location and receiving the broadband CATV signal from a headend over a distribution network, said apparatus comprising:
common circuitry including means for compensating and for distributing the broadband CATV signal to one or more subscriber modules, and control processor means for communicating with the headend over the distribution network and adapted to receive addressable instructions and data;

said one or more subscriber modules including master processor means for communicating with said control processor means and adapted to receive instructions and data from said control processor means;

means for storing frequency control words, each of said frequency control words representing a particular jamming frequency and including at least one mode control bit;

a plurality of jamming frequency generators for receiving said frequency control words and for generating a plurality of jamming frequencies representative of said frequency control words, at least one of said jamming frequency generators being capable of generating jamming frequencies in multiple frequency ranges;

jamming processor means for controlling said storing means to selectively output said stored frequency control words in a predetermined sequence and for controlling said jamming frequency generators to generate the plurality of jamming frequencies representative of said predetermined sequence, and for generating mode control signals from said at least one mode control bit, said mode control signals being applied to said least one of said jamming frequency generators to select one of said multiple frequency ranges;

means for combining said jamming frequencies with the broadband CATV signal to interdict the unauthorized channels.

* * * * *